Figure 1:
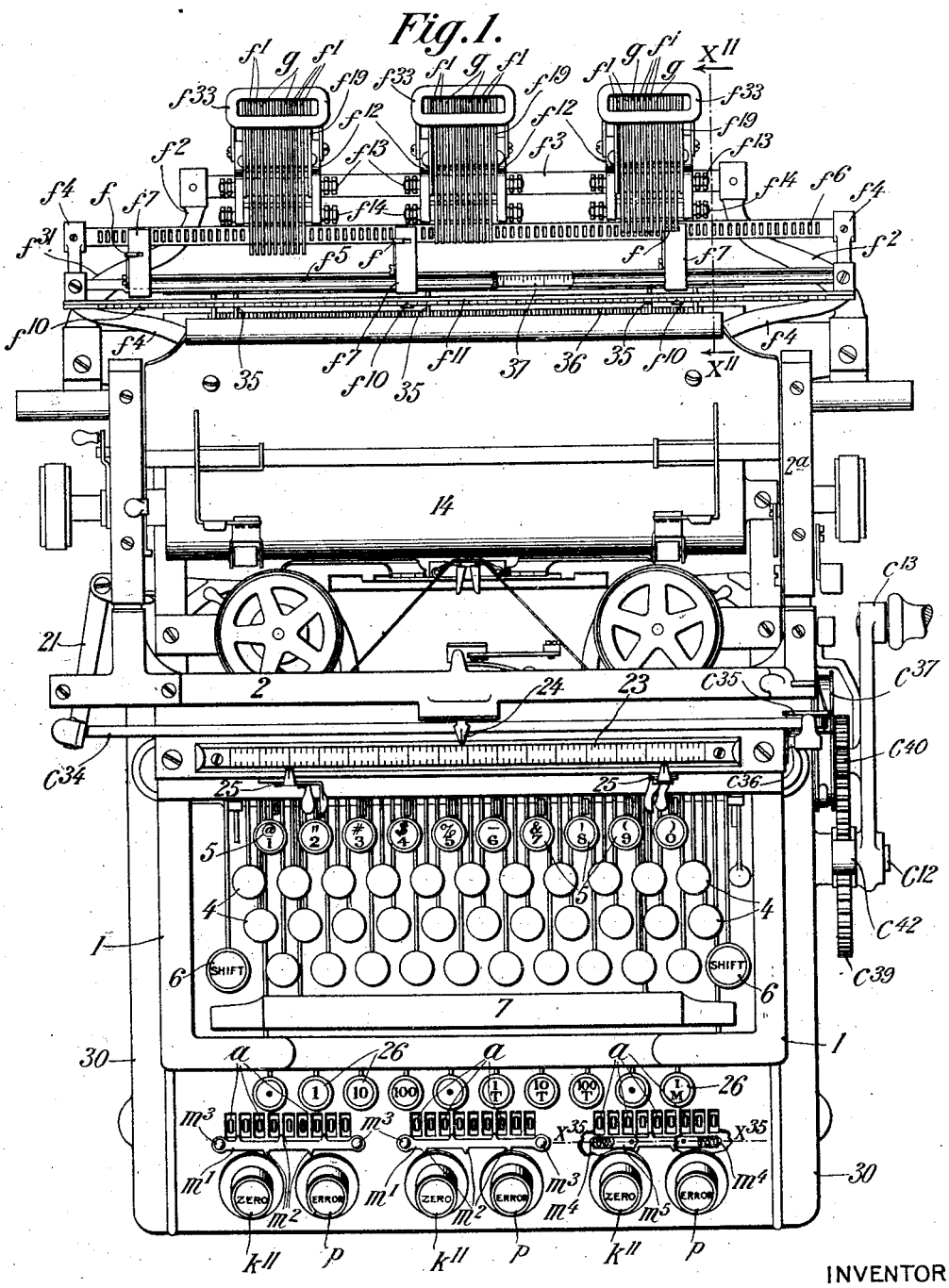

F. A. HART.
COMBINED TYPE WRITING AND COMPUTING MACHINE.
APPLICATION FILED MAY 10, 1916.

1,190,171.

Patented July 4, 1916.
14 SHEETS—SHEET 2.

WITNESSES:

INVENTOR:
Frederick A. Hart
BY
ATTORNEY.

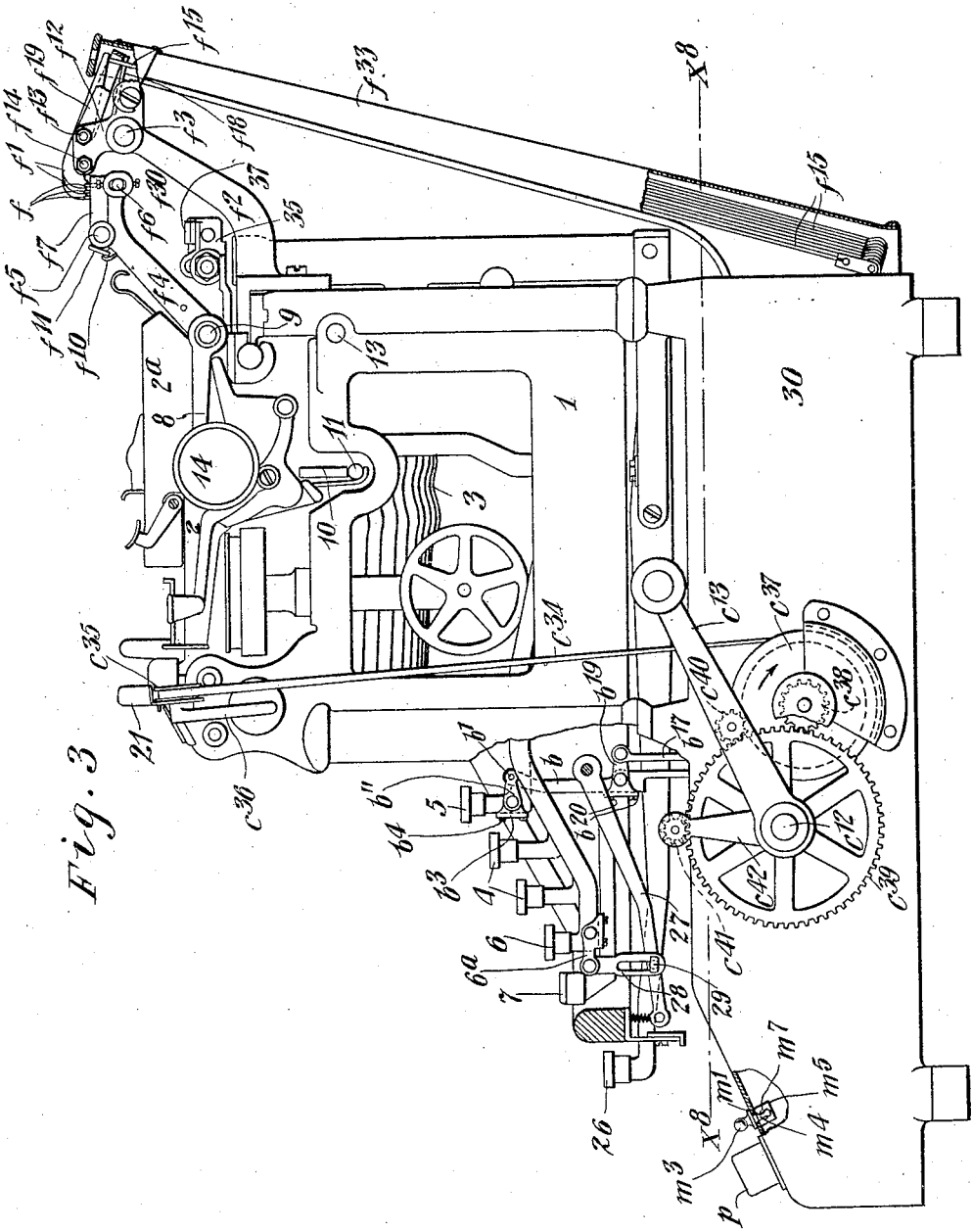

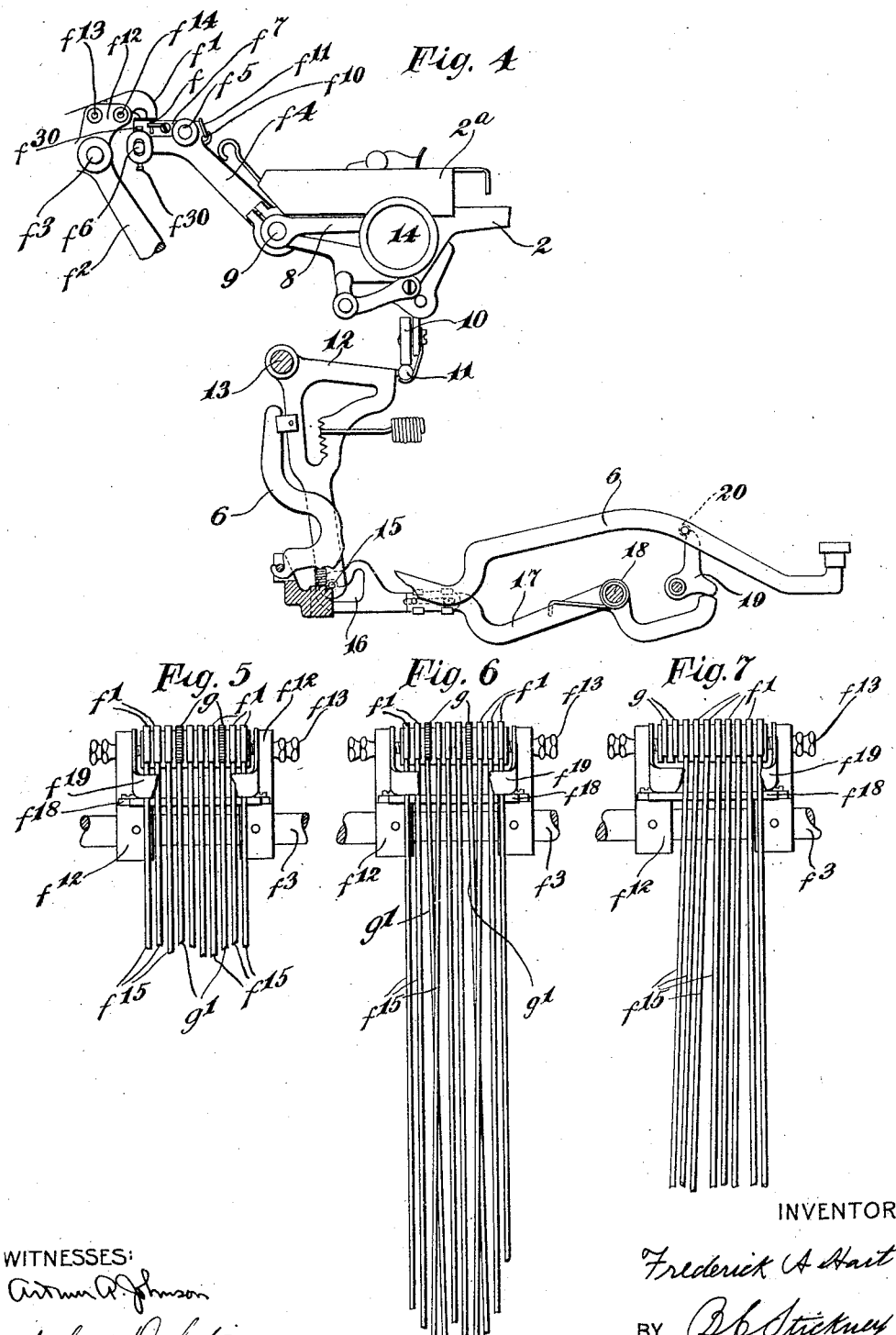

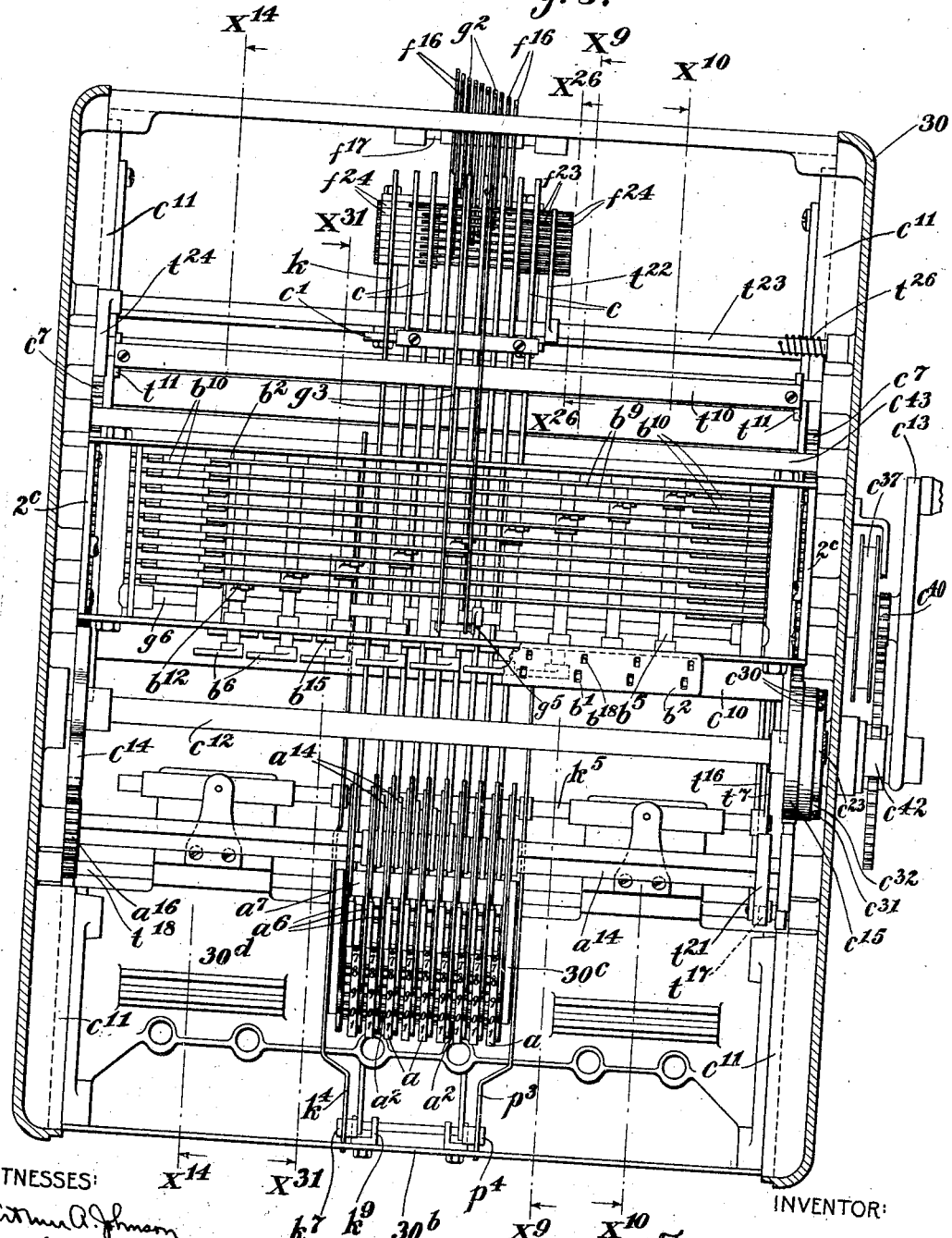

F. A. HART.
COMBINED TYPE WRITING AND COMPUTING MACHINE.
APPLICATION FILED MAY 10, 1916.
1,190,171.
Patented July 4, 1916.
14 SHEETS—SHEET 6.
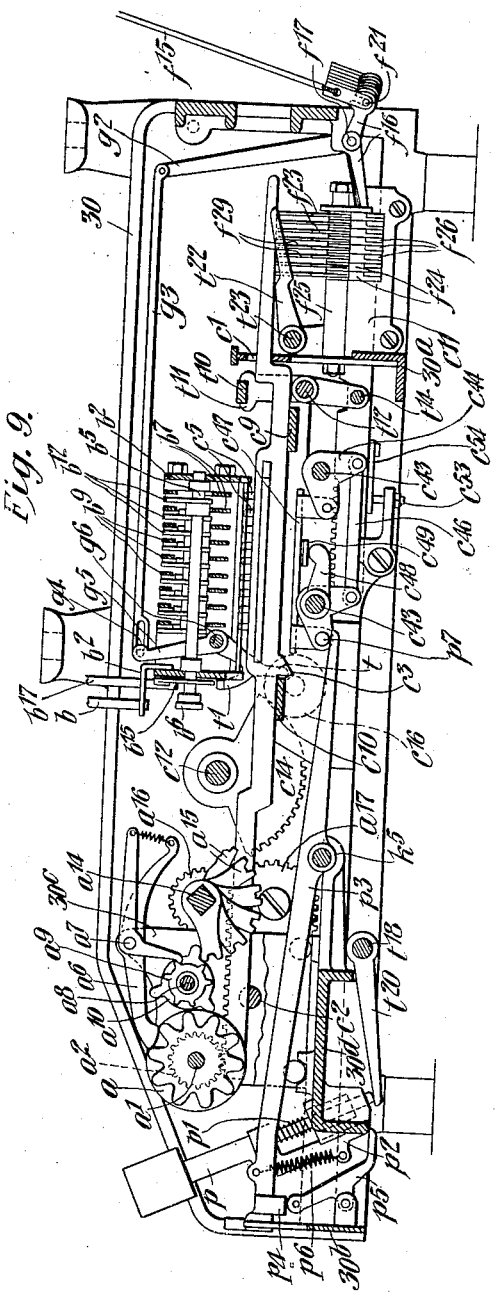
WITNESSES:
Arthur P. Johnson
Julius Duckstine
INVENTOR:
Frederick A. Hart
BY B. C. Stickney
ATTORNEY.

F. A. HART.
COMBINED TYPE WRITING AND COMPUTING MACHINE.
APPLICATION FILED MAY 10, 1916.
1,190,171.
Patented July 4, 1916.
14 SHEETS—SHEET 7.
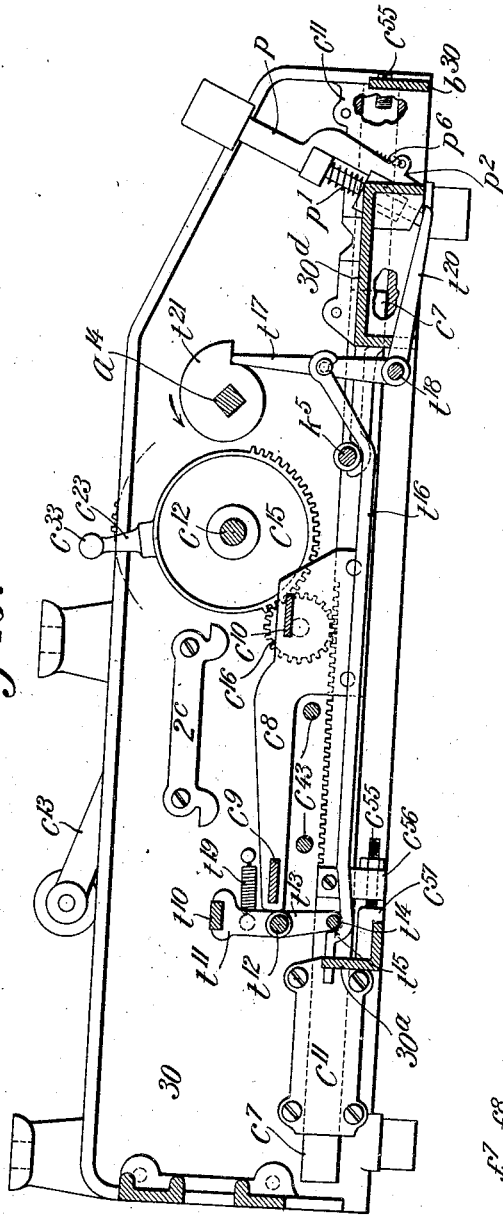
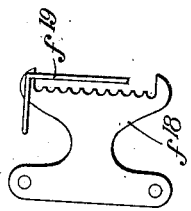
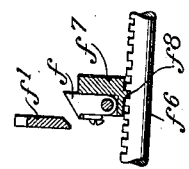
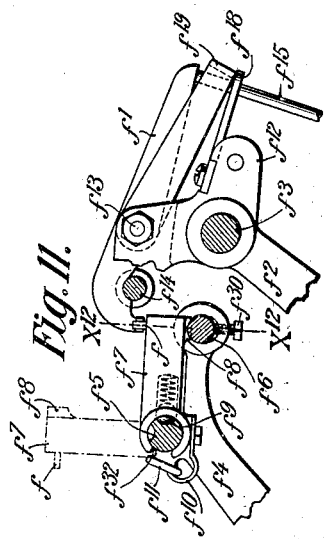
WITNESSES:
INVENTOR:
Frederick A. Hart
BY
ATTORNEY.

F. A. HART.
COMBINED TYPE WRITING AND COMPUTING MACHINE.
APPLICATION FILED MAY 10, 1916.
1,190,171.
Patented July 4, 1916.
14 SHEETS—SHEET 8.
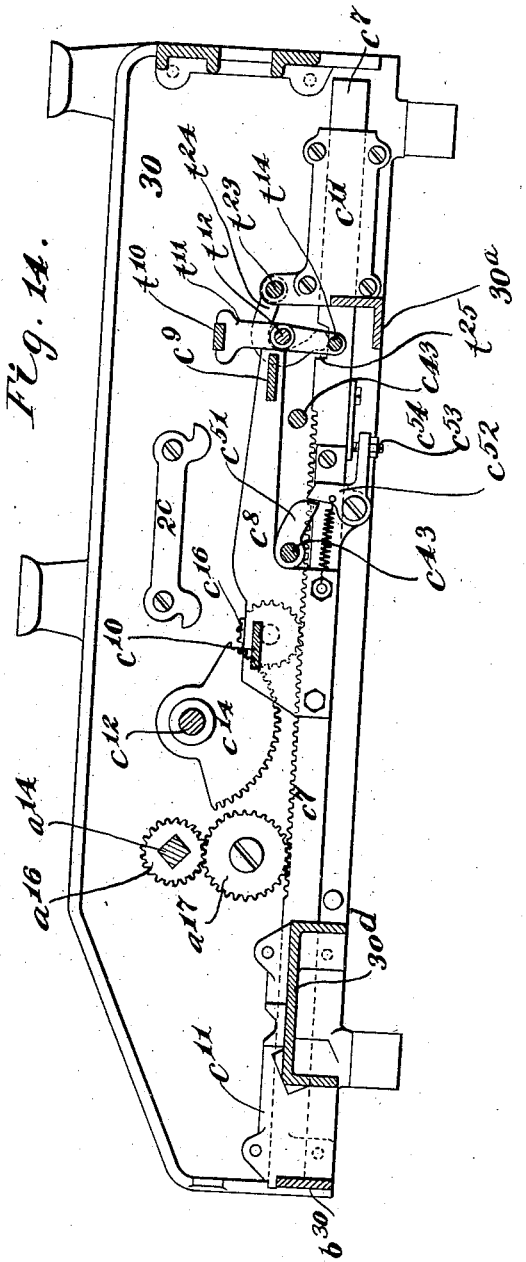
WITNESSES:
INVENTOR:
Frederick A. Hart
BY
ATTORNEY.

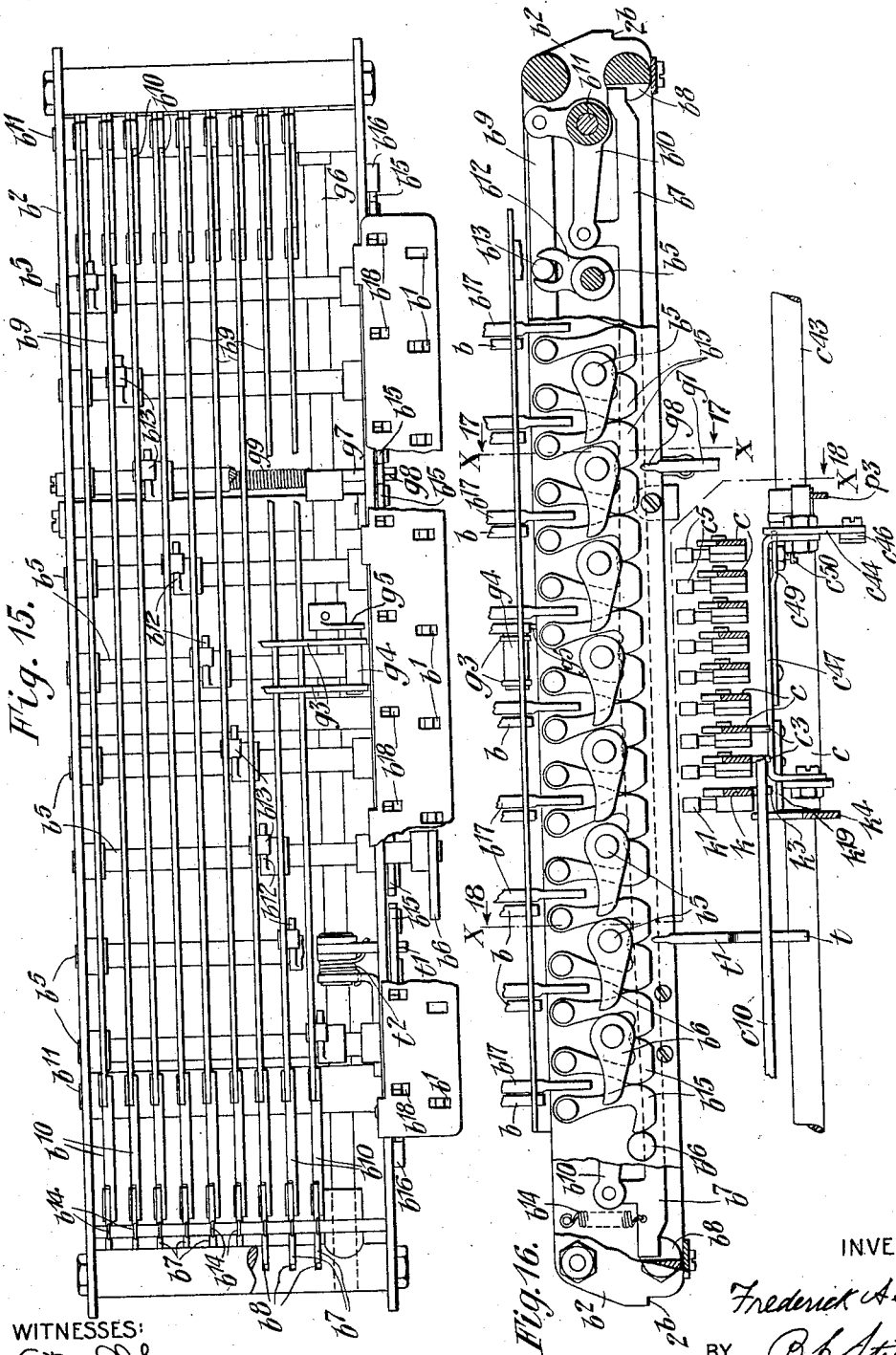

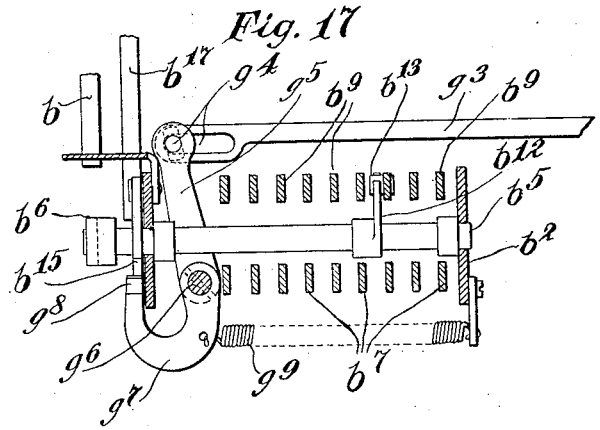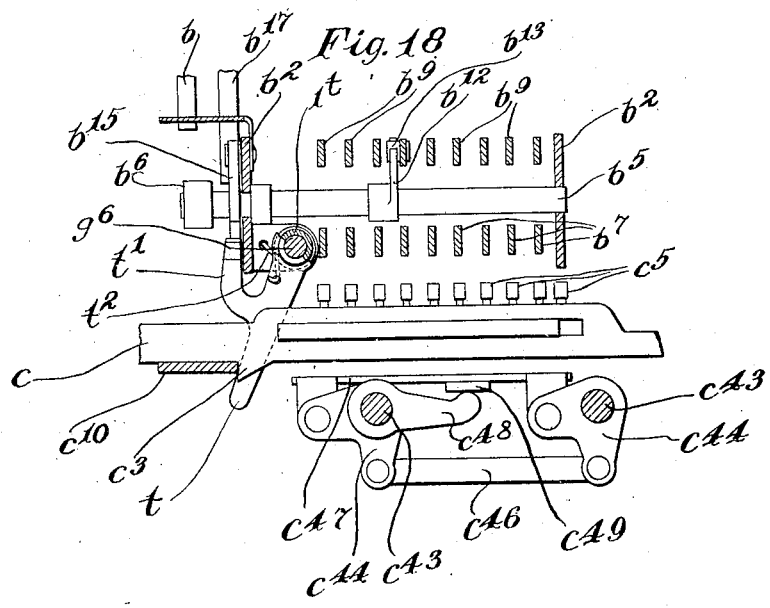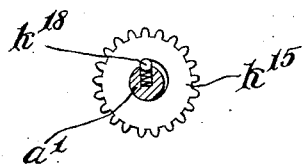

F. A. HART.
COMBINED TYPE WRITING AND COMPUTING MACHINE.
APPLICATION FILED MAY 10, 1916.
1,190,171. Patented July 4, 1916.
14 SHEETS—SHEET 11.
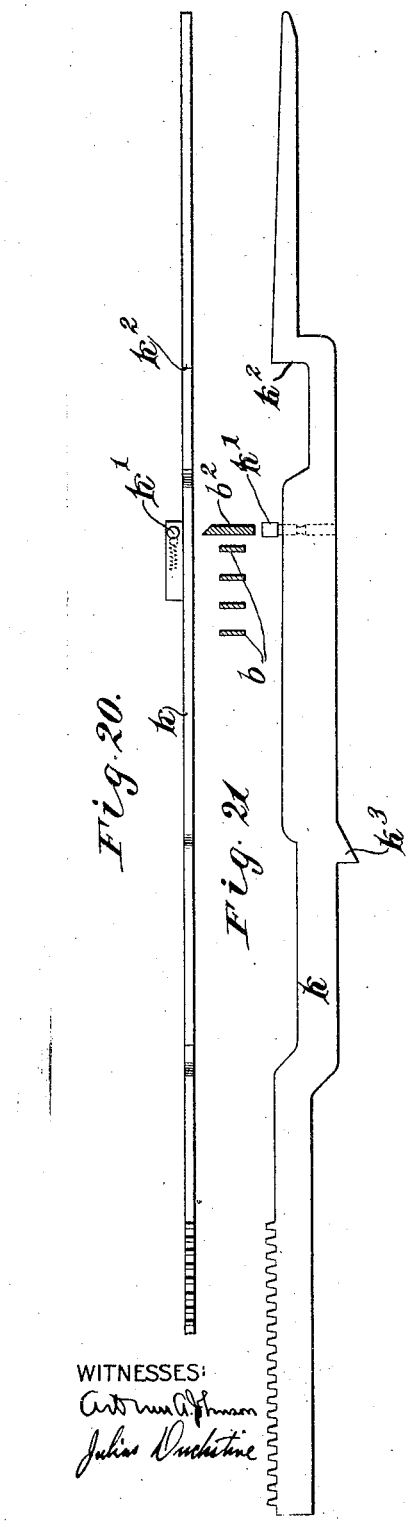
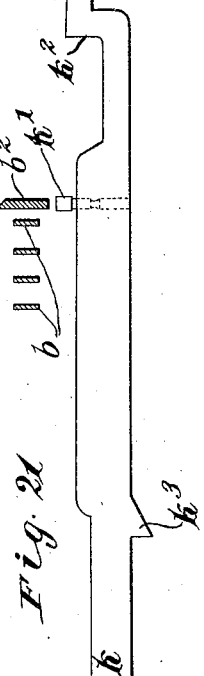
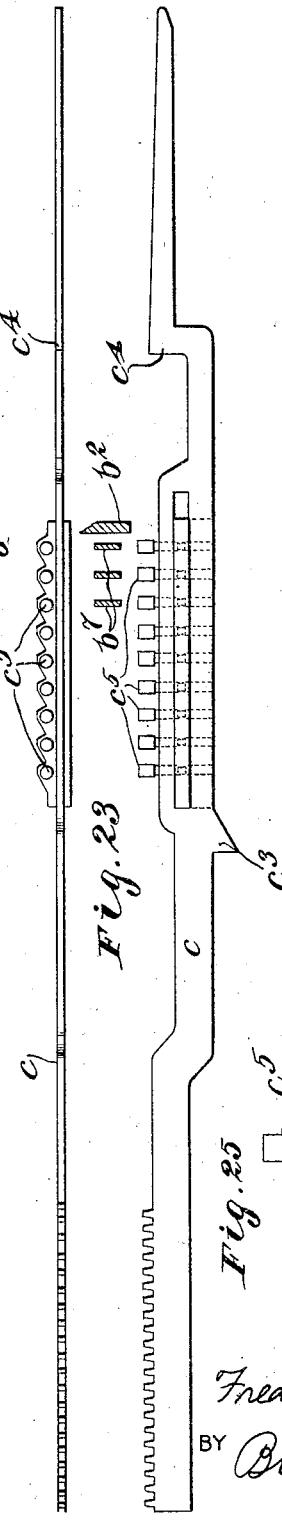
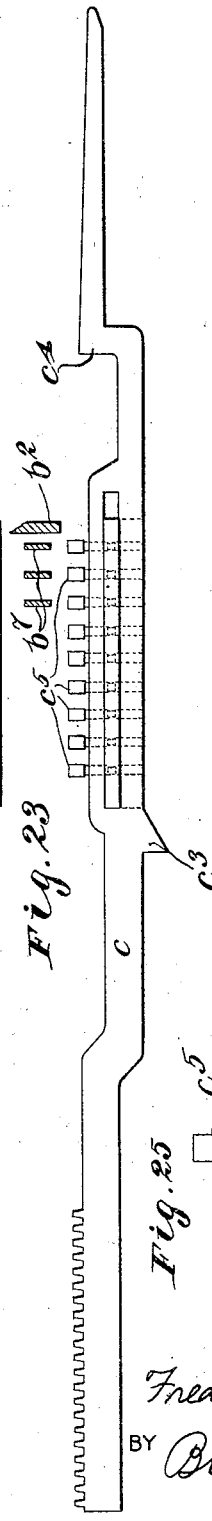
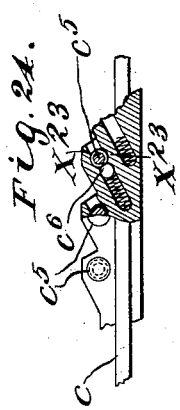
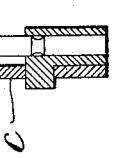
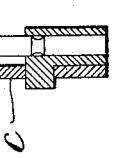
INVENTOR:
Frederick A. Hart
BY B. C. Stickney
ATTORNEY.
WITNESSES:

F. A. HART.
COMBINED TYPE WRITING AND COMPUTING MACHINE.
APPLICATION FILED MAY 10, 1916.
1,190,171.
Patented July 4, 1916.
14 SHEETS—SHEET 12.
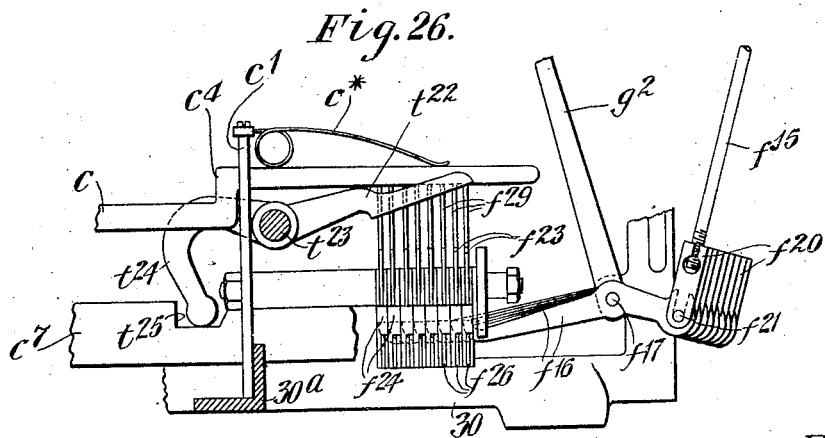
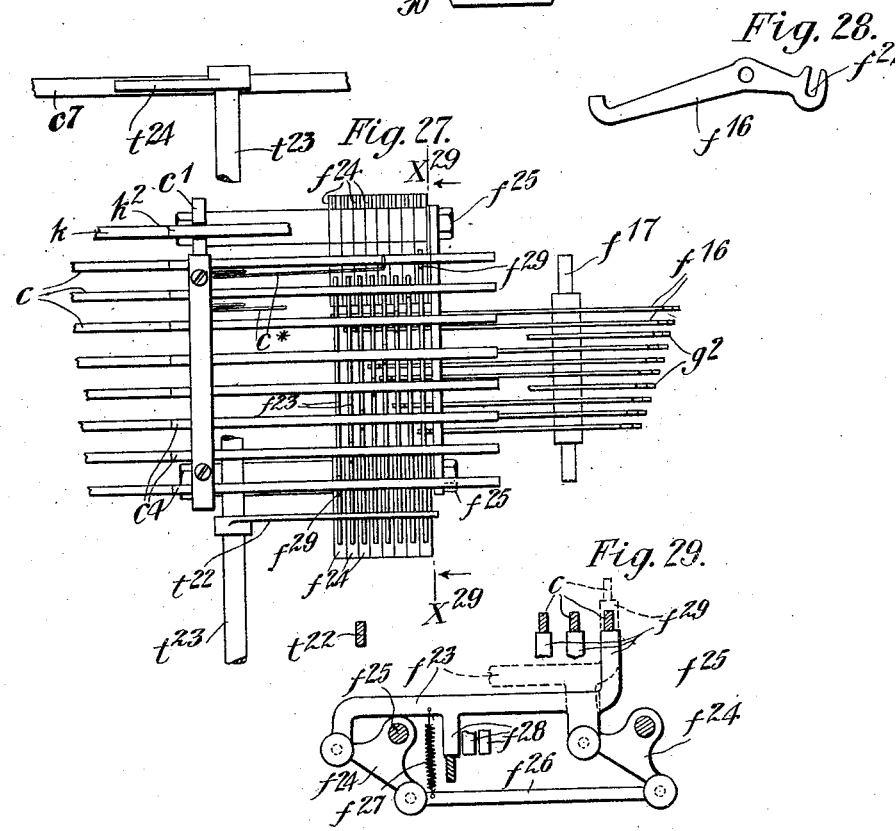
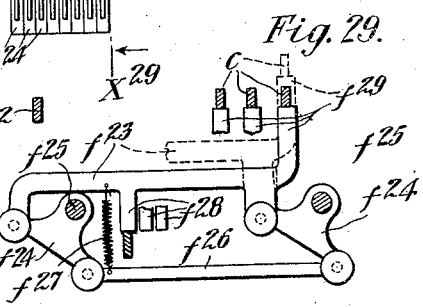
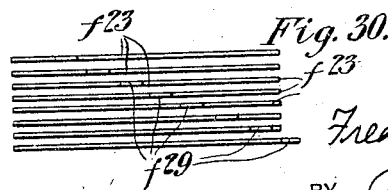
WITNESSES:
INVENTOR:
Frederick A. Hart
BY
ATTORNEY.

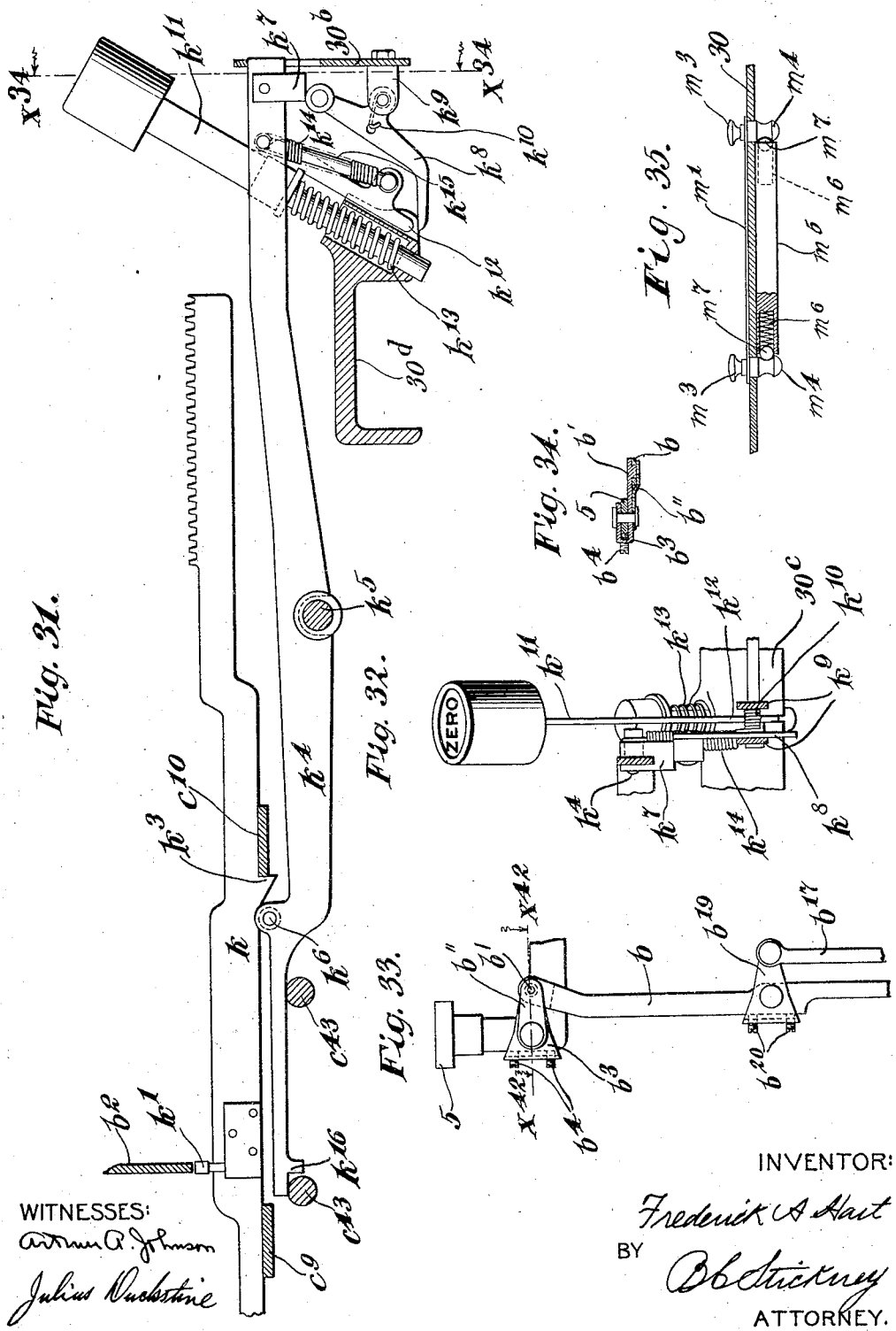

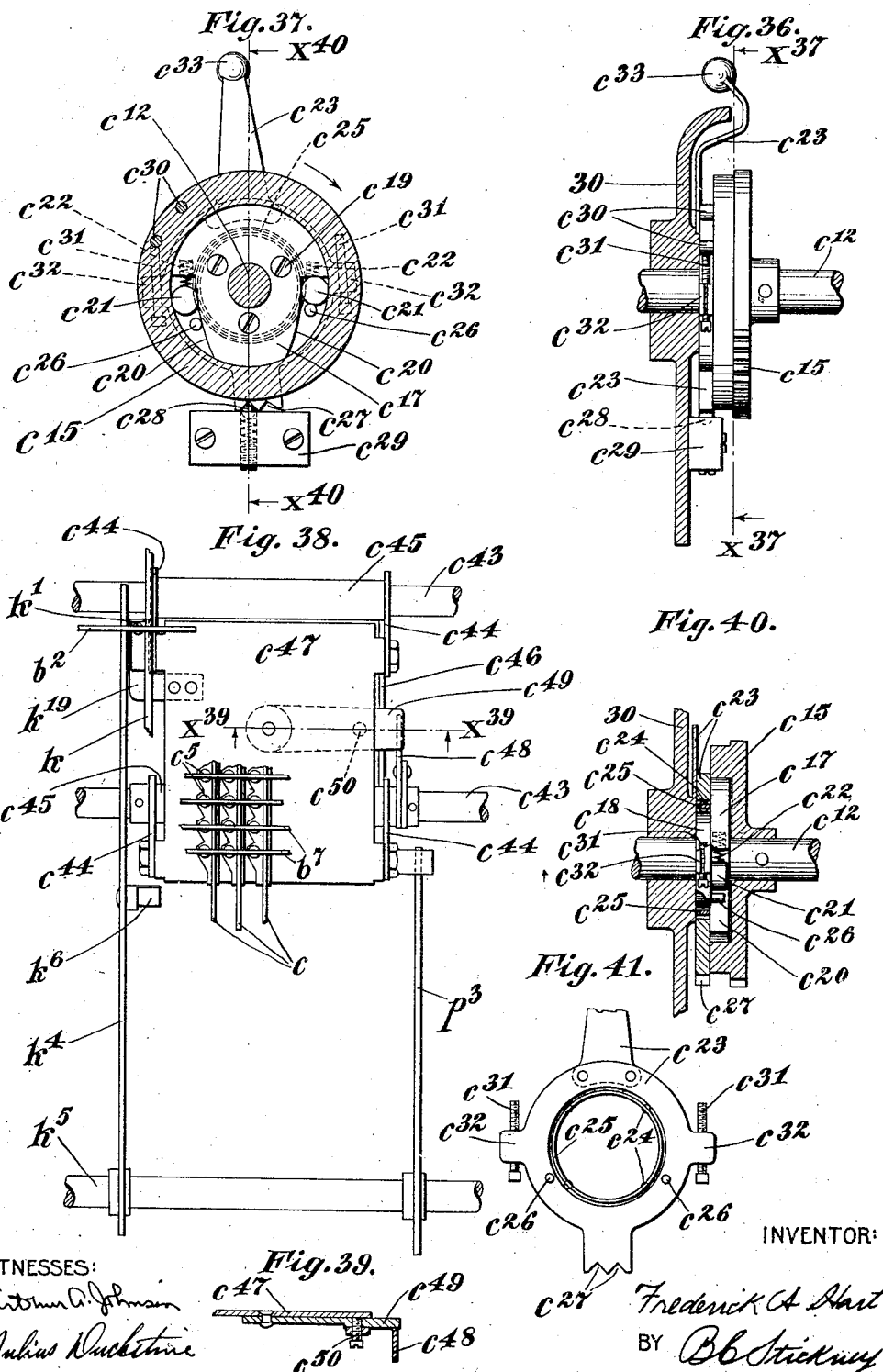

UNITED STATES PATENT OFFICE.

FREDERICK A. HART, OF NEWARK, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,190,171.  Specification of Letters Patent.  Patented July 4, 1916.

Original application filed December 10, 1908, Serial No. 466,836. Divided and this application filed May 10, 1916. Serial No. 96,527.

*To all whom it may concern:*

Be it known that I, FREDERICK A. HART, a citizen of the United States, residing in Newark, in the county of Essex and State of New Jersey, have invented certain new and useful Improvements in Combined Type-Writing and Computing Machines, of which the following is a specification.

My invention, which relates to computing machines and to combined typewriting and computing machines, has for its principal object to improve the construction and operation of machines of this general character; and the invention consists in the novel devices and combinations of devices hereinafter described and set forth in the claims. This application is a division of my application No. 466,836, filed December 10, 1908. Certain of the features disclosed in said application 466,836 are shown in my divisional Patent No. 1,176,364, granted March 21, 1916.

In machines of this class the numeral printing keys of the typewriter, as they are operated, set up individual indexing pins or devices, one for each printed digit; and the digits thus set up and printed or written are later carried into the computing or dial wheels, which go to make up a register. On the typewriter there is usually employed one single printing key for each of the nine digits; and in this class of machines there is provided a separate digit bar or computation bar for each of the computing wheels, whereby the same may be driven. The typewriter carriage selects the denomination, that is, determines in which denomination an index pin or device shall be set at the operation of a printing key, so that when a certain digit is printed, say, in the thousands place on the work-sheet, an indexing pin of corresponding value is at the same time set in the thousands place in the computing mechanism. These individually settable indexing devices may be termed preliminary representation devices, since the number that is eventually to be run into the dial wheels of the register is represented preliminarily by the setting of these index pins. Each of the digit bars or computation bars has a set, of usually nine, of these index pins. After the number has been completely set up by depressing a pin upon each of several digit bars, the latter may be driven forward by a general operator, which in this type of machine usually includes a cross bar, which, in advancing, strikes the depressed ends of the index pins, thereby driving all the bars, together with their dial wheels, each to an extent dependent upon the value of the set pin thereon. These bars usually have racks upon their forward ends, which racks are usually in engagement with dial-rotating pinions. In said divisional Patent No. 1,176,364, these digit bars, one of which is provided for each denomination, are individually shifted to pin-setting positions by means of a selector dog mounted upon the carriage of the typewriter. Said dog, during the letter-feeding movements of the carriage, displaces one after another a series of jacks which are connected to said digit bars; thus displacing the bars one by one. Thus the index pins upon the digit bars are successively brought within range of mechanism actuated by the printing keys of the typewriter. Each key in said patent is connected to a linkage which is capable of setting an index pin in any denomination. Each of the setting linkages is operated every time that its numeral key is depressed, but it is inoperative upon all its index pins except that one which is displaced as aforesaid by the dog upon the typewriter carriage. In this way, said selector dog determines the denomination of the computation bar which, as already explained, corresponds to the denomination of the numeral which is printed by the key upon the work-sheet.

One of the features of the present divisional application consists of the provision of a plurality of registers, so that at the printing of only one numeral upon the work-sheet, the indexing devices are set for a plurality of registers; and when the entire number is once written upon the work-sheet, said number may be carried into a plurality of registers, each having a gang or system of dial wheels. In the drawings is illustrated a machine in which a number once written may be carried into three registers simultaneously, but one of these registers may be omitted, if desired.

In the present application, one feature resides in the provision of the typewriter carriage with dogs or devices for determining what denomination of index pins shall be brought under the control of the numeral keys of the typewriter, suitable connections being provided between the selecting means which are on the carriage, and the index-pin devices which are controlled by the keys. Each key is capable of setting pins in all the denominations, while the carriage determines what denomination, at any particular time, shall be brought under the control of the keys. In order to do this, the dogs mounted on the carriage are adapted to engage each a series of denomination jacks or levers which are connected to a series of denominational bars, each of which carries a series of index pins. The dogs are preferably adjustable at different positions along the carriage, so as to permit the written columns to be placed at different portions of the work-sheet.

There are preferably nine index pins on each bar, and there may be nine bars, thus making eighty-one pins. Each of said jacks lifts its connected bar to bring the pins thereof into position to be struck by any of a series of pin-setting devices, these being connected respectively to the different numeral keys of the typewriter.

The letter-feeding movement of the carriage is toward the left, and the first denomination jack which is acted upon by the carriage dog or dogs is the highest one of the series. Nevertheless, the highest wheel is placed at the left of the series of wheels, and consequently the highest index-pin bar is arranged at the left of said series of index-pin bars (or register bars). A transposition device is provided between said denomination jacks and said bars, so that cross-connection is established between the right-hand denomination jack and the left-hand index-pin bar; the extreme left-hand jack being connected to the extreme right-hand index-pin bar; and the intervening index jacks and bars being correspondingly connected.

One more of the features of the invention consists in the provision of a plurality of totalizers or registers independent of each other for computing individual items, and means for causing any desired two or more of said registers to compute the same individual items simultaneously.

The carriage of the typewriting machine has a relatively long range of travel, so as to permit the writing of a column of figures at various positions regarded widthwise of the sheet; that is, a column may be written near the left-hand edge of the sheet, or near the right-hand edge, or at any one of sundry intermediate positions; and according to one feature of the present invention, a column which is to be computed simultaneously upon two or more registers may be written in any one of a variety of such positions; or in other words, the carriage can move into and out of the computing zone, and such zone may be variably located, and wherever located, any number which is written in such zone may be subsequently carried into two or more of the registers, although such registers may remain in stationary positions upon the typewriting machine. To this end the selector dogs upon the carriage are made individually adjustable, so that they may all be placed in positions corresponding with one another, so as to come in harmony with their respective sets of jacks at the time of writing the number in the desired location upon the work-sheet.

Moreover, when the carriage is outside of the adding zone, the keys may be freely operated without liability of affecting the computing mechanism, because of a provision for rendering each selector dog inoperative except upon its own set of denominational jacks; that is to say, when the carriage is in the adding zone, each selector dog may operate upon its own set of jacks, but when the carriage is out of said zone, each selector dog may pass idly by the jacks in the other sets. In fact, each dog is constructed to be incapable of operating any except its own jacks.

Furthermore, the machine is capable of a wide range of use, being so constructed that either two or three columns may be written side by side upon the work-sheet, and the numbers in each column added upon separate registers, each register being individual for its column; and by reason of the provision for adjustment between the selector dogs and the sets of denomination jacks, the columns may be placed more closely upon the work-sheet than the sets of denomination jacks are placed upon the machine; and other adjustments are permitted in the relative locations of the printed columns.

One of the features of this application relates to the control by the shift key and by the tabulator key of the connections between the dogs and the jacks.

In the Underwood typewriting machine, to which the improvements are described as being applied, a shift key is employed for causing the typewriter to print either capital letters or small letters at will. This shift key is connected to the aforesaid carriage dogs or denomination selectors to disable the latter, so that certain characters can be written upon the work-sheet affecting the adding mechanism (said characters being those which are formed upon the same type-bars with the numeral types and printed by the same keys). There is also usually provided on the Underwood typewriter, a key for releasing the carriage from the control of its letter-feeding mechanism, and there is preferably provided (according to the present application) means connecting such release key to the device that disables said denomination-selecting dog or dogs, so that when the carriage is being run rapidly, said dog or dogs will not engage any of the denomination jacks. Such release device is operable by the tabulator key or keys of the Underwood machine, and hence it follows that when the tabulating mechanism is being operated, the adding mechanism is put temporarily out of use, until the carriage has made its run and comes to rest at the desired position.

The capital shift key above referred to is connected to means for disabling such punctuation locking device, so that other characters than numerals may be written in the punctuation spaces if desired. There are also provided improvements in mechanism for re-setting the dial wheels to zero.

Another feature resides in providing improved means for restoring to normal position the index-pins after they have been utilized for determining the extent of rotation of their respective dial wheels. There is also preferably provided an indicator plate having means for differently grouping the decimal order of the dial wheels, to avoid confusion to the operator.

One of the features consists of a mechanism for facilitating the correction of errors, comprising a lever, a lock normally holding said lever against movement, and a key-set spring which moves the lever, the spring being set by the key and then causing the lock to release the lever. Preferably means are provided for re-setting to zero any one of said registers independently of the others. There are preferably provided means for bringing said registers one at a time under control of the keys, means for simultaneously bringing any desired two of said registers under control of the keys, means for accumulating numbers on said registers, and means for clearing one register at a time. As many of said registers as desired may be simultaneously "cleared" or re-set to zero.

There may be simultaneously set up index-pins representing numbers of equal digit and decimal values for different registers, and these numbers may be simultaneously carried into different registers. In that case, one register may be operated to be returned to zero condition independently of the remaining register or registers, and as to this feature the invention is not limited to the return of the register to zero condition by the means shown.

There may be a system of index pins for each register, and means preferably provided to act upon these pins for simultaneously setting up numbers on different groups of pins.

Other features and advantages will hereinafter appear.

My improved typewriting and computing machine is illustrated in the accompanying drawings, wherein like characters refer to like parts throughout the several views.

Figure 2:
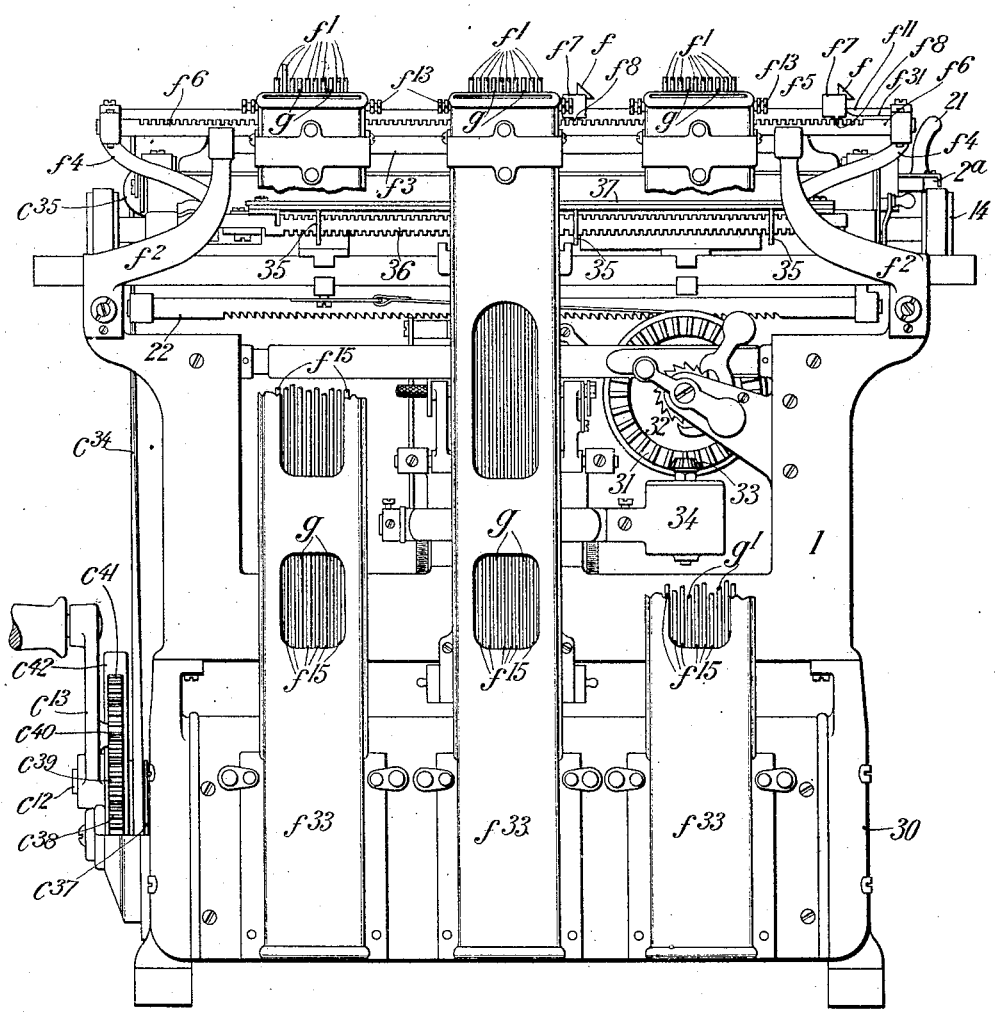

In the drawings: Figure 1 is a plan view showing the complete typewriting and computing machine. Fig. 2 is a rear elevation of the complete typewriting and computing machine with some parts broken away. Fig. 3 is a side elevation showing the complete typewriting and computing machine some parts being broken away, and some parts being sectioned. Fig. 4 is a skeleton view partly in side elevation, and partly in vertical section, and with some parts broken away, showing the shift key mechanism of the typewriter, and illustrating the relation thereof to parts of the so-called decimal order selecting mechanism. Figs. 5, 6 and 7 are details in rear elevation, showing parts of the decimal order selecting mechanism and of the punctuation-space key-locking mechanism, and illustrating the different adjustments of the latter. Fig. 8 is a horizontal section through the computer case, on the line $x^8$—$x^8$ of Fig. 3, the typewriter and certain other parts being removed from working position. Fig. 9 is a vertical section taken approximately on the line $x^9$—$x^9$ of Fig. 8, with the typewriter removed, and with some parts of the computing mechanism broken away. Fig. 10 is a vertical section taken approximately on the line $x^{10}$—$x^{10}$ of Fig. 8, with the typewriter and certain other parts removed. Fig. 11 is a detail in vertical section taken on the line $x^{11}$—$x^{11}$ of Fig. 1. Fig. 12 is a section taken on the line $x^{12}$—$x^{12}$ of Fig. 11. Fig. 13 is a detail with parts broken away, showing a guide for the upper ends of the lever connecting rods of the decimal order selecting mechanism, and of the punctuation-space key-locking mechanism. Fig. 14 is a vertical section taken approximately on the line $x^{14}$—$x^{14}$ of Fig. 8, with the typewriter and certain other parts removed. Fig. 15 is a detail view in plan, with some parts broken away and some parts removed, showing the so-called unit bars and associated parts. Fig. 16 is a front elevation of the parts shown in Fig. 15, showing also, underlying register bars, unit pins, and certain other parts, said unit bars being sectioned. Fig. 17 is a detail in transverse vertical section taken on the line $x^{17}$—$x^{17}$ of Fig. 16. Fig. 18 is a transverse vertical section taken on the irregular line $x^{18}$—$x^{18}$ of Fig. 16. Fig. 19 is a detail view partly in side elevation and partly in section, showing a clutch device which constitutes part of the zero mechanism, for resetting the register wheels at zero. Fig. 20 is a plan view showing the so-called zero bar, part thereof being broken away. Fig. 21 is a side elevation of said zero bar and shows also several of the unit bars and a coöperating portion of the unit bar frame, in section. Fig. 22 is a plan view showing one of the register bars, and its unit pins. Fig. 23 is a side elevation of the said register bar, and shows also in section, several of the overlying unit bars and a portion of the unit bar frame. Fig. 24 is an enlarged detail, partly in plan and partly in horizontal section, illustrating the manner in which the unit pins are mounted on the register bars. Fig. 25 is a section taken approximately on the line $x^{25}$—$x^{25}$ of Fig. 24. Fig. 26 is a detail in vertical section taken approximately on the line $x^{26}$—$x^{26}$ of Fig. 8, some parts being broken away. Fig. 27 is a plan view of parts shown in Fig. 26, some parts being broken away, and some parts being removed. Fig. 28 is a detail showing in side elevation, one of the lower selecting levers of the decimal order selecting mechanism, a plurality of which are shown in Figs. 26 and 27, and elsewhere. Fig. 29 is a transverse vertical section viewed from the rear, taken approximately on the line $x^{29}$—$x^{29}$ of Fig. 27, some parts being removed. Fig. 30 is a plan view of the so-called transposing bars shown in Figs. 26 and 27, all other parts being removed. Fig. 31 is a detail view taken in section on the line $x^{31}$—$x^{31}$ of Fig. 8, showing the zero key and zero bar and coöperating connections. Fig. 32 is a transverse section taken on the line $x^{32}$—$x^{32}$ of Fig. 31. Fig. 33 is a detail view in side elevation, showing a portion of one of the numeral keys, and particularly illustrating the means for adjustably connecting the so-called push bars to the respective numeral keys, and depending stems to said push bars. Fig. 34 is a section taken on the line $x^{34}$—$x^{34}$ of Fig. 33. Fig. 35 is a section taken approximately on the line $x^{35}$—$x^{35}$ of Fig. 1. Fig. 36 is a detail view chiefly in rear elevation with some parts sectioned, showing a full stroke device for the operating lever and operating carriage. Fig. 37 is a section taken on the line $x^{37}$—$x^{37}$ of Fig. 36. Fig. 38 is a detail view showing, in plan, portions of the unit pin restoring device, of the unit bars, the register bars, unit pins, the zero bar, the register bar intercepting stop, and certain other parts. Fig. 39 is a detail in section on the line $x^{39}$—$x^{39}$ of Fig. 38. Fig. 40 is a section taken on the line $x^{40}$—$x^{40}$ of Fig. 37, some parts being broken away. Fig. 41 is a detail of the side elevation, showing the reversing lever of the said full stroke device, some parts being broken away.

In the detailed description, the following classification of mechanism and of reference notations appropriated thereto, are made, to-wit:—The parts of the typewriter and of the computer case, designated by numerals. Register proper, designated by $x$ and its powers. The unit bars, their connections to numeral keys of typewriter, and associated parts, designated by $b$ and its powers. Decimal order register bars, unit pins or preliminary representation devices, operating carriage and associated parts, including variable throw and full stroke devices, designated by $c$ and its powers. Decimal order selecting mechanism, designated by $f$ and its powers. Punctuation-space key-locking mechanism, designated by $g$ and its powers. Zero device, designated by $k$ and its powers. Error correcting devices, designated by $p$ and its powers. Additional safety devices, including carriage operated numeral-key lock; register bar safety lock, operated by error correcting key and by operating carriage; and carriage operated transposing bar depressing device, indicated by $t$ and its powers.

*Typewriter and computer case.*—The typewriter illustrated is a No. 5 Underwood, the construction and operation of which is well understood. Hence, for the purposes of this case, parts of this typewriter will be identified only to an extent which will make clear the relation of the typewriting mechanism to the computing mechanism.

Directing attention particularly to Figs. 1, 2 and 3, the numeral 1 represents the typewriter frame, the numeral 2 the typewriter carriage, the numeral 3 the type bars, the numeral 4 the character keys, the numeral 5 the numeral keys, the numeral 6 the shifting keys, and the numeral 7 the spacing bail or space bar. All of these keys, are, of course, spring held in their uppermost or normal positions.

The typewriter carriage 2, see particularly Fig. 4, has a vertically movable supplemental frame 2ª, that is held for parallel movements by arms 8 connected to a rock shaft 9, mounted in suitable bearings on the carriage 2, and it has the customary wheel 10 that runs upon a guide rod 11, connected for parallel movements by a pair of bell crank levers 12 secured to a rock shaft 13, which in turn, is journaled in suitable bearings on the sides of the typewriter frame 1, all as best shown in Figs. 3 and 4. The platen or paper-supporting roller 14 is, of course, carried by the supplemental frame 2ª.

The upwardly extended rear ends of the shift keys 6 engage the backs of the bell crank levers 12, so that when either one of the shift keys is depressed, rod 11 will be raised, thereby lifting up the supplemental frame 2ª with its roller or platen 14, so as to thereby present the printing surface of the paper on the roller, to the upper-case letters of the type bars.

In the normal position of the parts, best shown in Fig. 4, a lock pin 15 on the lower end of one of the bell crank levers 12, engages the rear extremity of a cam slot 16 formed in the rear end of a downwardly spring-pressed shift lock lever 17, intermediately pivoted on a fixed rod 18 and subject, at its forward end, to a cam acting rocker 19, the upper end of which, in turn, is subject to the action of a cam pin or projection 20 on one of the shift keys 6. By this means, the supplemental section 2ª of the typewriter carriage, while always free for common traveling movements with the main section 2 of the said typewriter carriage, is nevertheless normally locked against rising movement by the engagement of the said pin 15 with the upwardly extended rear extremity of the said slot 16. This locking feature has an important relation to the decimal-order-selecting mechanism, hereinafter described.

The numeral 21 indicates a spring-held line-feed lever which is connected to the platen or roller 14 in the customary way, through a pawl and ratchet device, so that when the said lever is moved toward the right, the roller and paper will be moved one step, as required for the line feed. The typewriter carriage is under spring tension from a suitable motor spring, not shown, and moves from right toward the left, with a step-by-step motion, under the control of a suitable escapement that is subject to the key action. Of the parts of this escapement, only the rack 22 is shown in Fig. 2.

On the front of the upper portion of the typewriter frame 1 is a long transversely-extended scale 23, with which a pointer 24 on the typewriter carriage 2 coöperates, to indicate a transverse location on the paper, where characters will be printed, in any position of the typewriter carriage.

The numeral 25 indicates stops adjustably secured on a transverse rod (not shown), which, in turn, is rigidly secured to the typewriter frame 1 at the upper front portion thereof, to-wit, immediately below the scale 23. These stops 25 serve to variably limit the extreme travel of the typewriter carriage.

The numeral 26 indicates upwardly spring-pressed tabulating keys (see Figs. 1 and 3), which operate in the usual way to release the typewriter carriage, for tabulating purposes; and the numerals 35, 36 and 37 (see Fig. 2) indicate respectively, the adjustable tabulating stops, the notched stop-supporting bar, and the coöperating scale of the tabulating mechanism. The usual key-actuated intercepting bars (not shown) coöperate with the tabulating stops 35, to intercept the movements of the typewriter carriage, in the tabulating action.

All parts of the typewriter so far described, are found in the No. 5 Underwood equipped with tabulating mechanism, which, as above stated, is the typewriting machine illustrated in the drawings.

For the purpose of this case, it is only necessary to state that the depression of any tabulating key will depress also one of the shift keys 6 (as shown, the right-hand shift key), while the depression of the said shift key will not depress any of the said tabulating keys; and that this is accomplished by means of an upwardly spring-pressed bail 27, pivotally connected to the typewriter frame 1, with its transverse free portion underlying all of the said tabulating keys 26; and by a link 28, pivotally connected to an extension 6ª of the said right-hand shift key 6, and having a slot that is engaged by the head of the stud 29 on one side of the said bail 27, as best shown in Fig. 3.

The Underwood typewriter No. 5 is provided with an automatic speed-governing mechanism, for controlling the speed of the typewriter carriage when the latter is released from its step-by-step controlling escapement. Of the parts of this speed-governor, in so far as they are shown in Fig. 2, the numeral 31 indicates a bevel gear rigidly attached to the spring barrel 32 that encases the main spring (not shown) which propels the carriage in its operative movement. The numeral 33 indicates a pinion meshing with the bevel gear 31 and secured on a short shaft, having its bearings in the cylindrical casing 34 that contains the speed-regulating mechanism proper. This cylindrical casing is pivotally mounted on the typewriter frame, and normally it is swung away from the bevel gear 31 so that the pinion 33 is out of mesh with said bevel gear during the ordinary movements of the typewriter carriage.

The tabulating keys 26, through connections (not shown), operate when any one thereof is depressed, to move the casing 34 on its pivot, and thereby cause the pinion 33 to mesh with the gear 31; and in this way, the speed-governing mechanism is thrown into action whenever a tabulating key is depressed, and the typewriter carriage is disconnected from its step-by-step escapement mechanism.

The computer case upon which the typewriter frame is detachably mounted, and within or upon which most of the parts of the computing mechanism are directly or indirectly mounted, is indicated by the numeral 30, and, as shown, it is of rectangular box-like form, and is provided with various bearings and shafts and other parts which will be particularly noted in connection with other groups of mechanism.

*The register.*—For the purpose of independently listing and adding numbers in several columns, on a sheet of paper, the machine herein illustrated is provided with several registers having corresponding independently-operating decimal-order-selecting mechanism, and corresponding preliminary representation devices, including register bars, and unit pins mounted thereon.

My invention is not in the field of register construction *per se*. Each register may comprise a group of decimal-order digit-bearing wheels $a$, Fig. 9, all as shown, mounted on a cross shaft $a^1$, supported by bearing brackets rising from the bottom of the computer case 30. On their hubs, the register wheels $a$ have loosely-mounted gears $a^2$, connected therewith through ratchet and one-way ball clutches, not shown, and these, as will hereinafter appear, mesh with the teeth of underlying register bars, and are subject to the action of the latter, when the so-called operating carriage of the computer is moved forward. The register wheels are held against accidental movements by spring held levers $a^6$ mounted on a transverse rod $a^7$. On a parallel cross shaft $a^8$ are mounted certain wheels constituting parts of the tens-carrying mechanism, two of these only appearing in the drawings, to-wit, the six-toothed wheel $a^9$ and the three-toothed wheel $a^{10}$. On another cross shaft $a^{14}$ are mounted a series of gear segments or toothed arms $a^{15}$, which coöperate with the parts on the shaft $a^8$, in the tens-carrying action.

The tens-carrying shaft $a^{14}$ has a pinion $a^{16}$ connected therewith by a one-way clutch device, not shown, but which may be identical with that shown in Fig. 19; and this pinion $a^{16}$ meshes with an intermediate gear $a^{17}$ journaled on one side of the case 30, and meshing with the left-hand rack bar $c^7$ of the operating carriage hereinafter described, as best shown in Fig. 14.

The counting wheels $a$ may be simultaneously operated or moved different distances by the coöperating register bars, under the forward action of the computer carriage, and thereby the tens-carrying devices will be so set that the tens will be carried forward, from one denomination to the other, in the regular order of the decimal scale, or from right toward the left, under the return movement of the computer operating carriage.

*Unit bars, and their connections to numeral keys of typewriter.*—Directing attention particularly to Figs. 3, 8, 9, 15, and 16, it will be seen that the numeral keys 5 are provided with depending push bars $b$ that work through slots $b^1$ in the forwardly-projecting flange of a transversely-extended elongated rectangular frame $b^2$, supported from the computer case 30. Preferably, the unit bar frame $b^2$ is detachably mounted on the computer case 30, see Figs. 10 and 16, and hence, the ends of the transverse bars of said frame are notched at $2^b$ for engagement with the depressed ends of supporting strips $2^c$ rigidly secured on the sides of the said case 30.

To make bars $b$ adjustable and removable, they are pivoted on studs $b'$ of coupling brackets $b^3$ that are intermediately pivoted on the numeral keys 5, and are adjustably locked thereto by opposing set screws $b^4$; and said brackets are provided with laterally movable retaining springs $b''$, that hold said bars from accidental uncoupling, as best shown in Figs. 33 and 34.

In the frame $b^2$ are journaled a series of nine rock shafts $b^5$ (Figs. 8 and 9) spring held in their normal positions, and extending in a direction from front toward the rear of the computer case. At their forwardly-projecting ends, each underlying the lower end of one of the push bars $b$, the said rock shafts are provided with arms $b^6$ (Fig. 32) that are adapted to be engaged by the said corresponding push bars when the corresponding numeral keys 5 are depressed.

Mounted for vertical movements in frame $b^2$ are nine so-called unit bars $b^7$ that are parallel to each other, and extend at right angles to the rock shafts $b^5$, or, in other words, that extend transversely of the computer case 30 and of the underlying register bars, presently to be described. As shown in Fig. 16, the ends of unit bars $b^7$ work in grooves $b^8$ cut in the lower transverse end bars of the frame $b^2$, and are thereby held against lateral movements. Each unit bar $b^7$ is coupled to a corresponding overlying tie bar $b^9$ by a pair of bell cranks $b^{10}$, which are loosely mounted on transverse rods $b^{11}$ secured to the sides of the frame $b^2$.

Each rock shaft $b^5$ has a short arm $b^{12}$, shown as provided with a slotted end that engages a stud or projection $b^{13}$ on the corresponding tie bar $b^9$, see Fig. 16. These arms $b^{12}$, see Fig. 15, are arranged on an oblique line, so that the numeral keys from lower to higher orders, or in a direction from left toward the right, are coupled to, or operative on, the series of unit bars located successively from the front toward the rear of the machine, this being done for an important purpose which will appear when considering the arrangement of the unit pins or preliminary representation devices on the register bars.

As shown in Fig. 16, $b^{14}$ indicates coiled springs, which yieldingly pull the unit bars $b^7$ upward, and normally hold the same and the coöperating bell cranks $b^{10}$, tie bars $b^9$, rock shafts $b^5$, and rock shaft arms $b^6$ and $b^{12}$, in the positions best shown in said Fig. 16.

With the construction described, it is evident that the depression of one of the numeral keys will result in the depression of the corresponding unit bar $b^7$. It will also be noted, particularly by reference to Fig. 13

16, that a very considerable portion of the downward movement of the depressed numeral key, is required to bring connected push bar $b$ into engagement with the corresponding rock shaft arm $b^6$; and in this connection, it may also be noted that the upper arms of the bell cranks $b^{10}$ are very short as compared with the lower arms thereof, so that a very small portion of the final downward movement of a numeral key is required to effect a considerable downward movement of the corresponding unit bar. The especial object of this construction is to provide for very light "touch" and rapid successive movements of the numeral keys, by depending very largely upon the momentum of the type bars to operate the unit bars $b^7$.

For coöperation with other parts, to lock the numeral keys 5 in normal or inoperative positions under several different operations, a series of rockers or cam blocks $b^{15}$ is provided, and these so-called rockers, as shown, are pivotally connected to the vertical front plate or side of the frame $b^2$, and are arranged to work between a pair of stops $b^{16}$ on the said frame plate. As shown in Figs. 15 and 16, there is but little play or space between said rockers $b^{15}$ and the stops $b^{16}$.

For coöperation with the said rockers $b^{15}$, to prevent the operation of more than one numeral key at a time, that is, to lock all other numeral keys in their normal positions, or in positions in which they cannot be made to operate either the printing or computing mechanism when any one of the numeral keys is operatively depressed, each of said numeral keys is provided with a depending lock stem that is arranged to be forced downward between the underlying two adjacent rockers, and thereby take up all play between the rockers and stops $b^{16}$. These lock stems $b^{17}$ are preferably individual members that work through slots $b^{18}$ in the forwardly-projecting flange of the frame $b^2$, and at their upper ends, see Figs. 3 and 33, are pivotally connected to coupling brackets $b^{19}$, intermediately pivoted to the intermediate portions of the respective bars $b$, and adjustably secured thereto by opposing set screws $b^{20}$. The adjustable coupling brackets $b^3$ and $b^{10}$ permit of very accurate adjustment of the bars $b$ and stems $b^{17}$, in respect to the coöperating rock shaft arms $b^6$ and rockers $b^{15}$, so that the precise relative times of action thereof may be properly regulated. By reference to Fig. 16, it will be noted that the lower ends of the stems $b^{17}$ will be engaged with the coöperating rockers $b^{15}$, before the corresponding bars $b$ will be engaged with the coöperating rock shaft arms $b^6$.

It may be further added that the play between the rockers $b^{15}$ and stops $b^{16}$ is only sufficient to allow one of the lock stems $b^{17}$ to be forced downward between the said rockers at any one time.

*Decimal order register bars, unit pins or preliminary representation devices, operating carriage and associated parts, including variable throw and full stroke devices.*— Attention is particularly called to Figs. 8, 9, 22, 23, 24 and 25. For each register, comprising, as shown, nine digit-bearing wheels, there is a series of eight so-called register bars; to-wit, one for each register wheel, except the register wheel of highest order, which latter is at the extreme left in respect to Fig. 8. These register bars $c$ extend from front toward the rear of the machine, below the unit bars $b^7$, and hence, at a right angle to the latter, and are independently movable. At their forward ends, the register bars $c$ have toothed rack portions that mesh with the gears $a^2$ of the respective register wheels $a$. At their rear ends, the said register bars are guided for longitudinal movements and are permitted limited vertical movements, but a guide comb or slotted plate $c^1$, that is rigidly secured, as shown, to a transverse bottom bar $30^a$ of the computer case 30. The rear ends of these register bars are yieldingly held down by light springs $c^*$, shown on Fig. 26. At their forward ends, said register bars $c$ slide over and are capable of a slight rocking action on a fulcrum rod $c^2$, supported by the register-bearing brackets $30^c$, and preferably notched so as to hold the forward ends of said register bars properly spaced.

Each register bar, at its intermediate portion, is provided with a depending lug $c^3$, and just forward of the guide comb $c^1$, each register bar is formed with the shoulder $c^4$, the purposes of which will appear later on.

Each register bar $c$ carries a series of nine vertically movable unit pins $c^5$ preferably mounted in thickened central portions of said bars and yieldingly held by spring-pressed balls $c^6$, best shown in Fig. 24.

When the register bars $c$ stand in their normal positions, their unit pins $c^5$ stand directly under the respective unit bars $b^7$, as best shown in Figs. 9, 18 and 22, but lie far enough below the same, so that the depression of the said unit bars will not engage the respective unit pins, unless the rear portion of a register bar is raised by the decimal-order-selecting mechanism, in which case, however, the depression of any unit bar will force downward into "set" position, the corresponding unit pin of such raised bar. The computer operating carriage or general operator, shown as made up of a pair of laterally-spaced rack bars $c^7$, side plates $c^8$ rigidly secured to said rack bars $c^7$, and a pair of transverse tie bars $c^9$ and $c^{10}$, is mounted to move within the computer case 30, in the direction from front toward the rear thereof, see particularly Figs. 8, 9, 10 and 14. The rack bars $c^7$, as shown, are arranged to move through suitable guide bearings $c^{11}$ on the sides of the case 30, as best shown in Fig. 14. The carriage bar $c^9$, hereinafter designated as a push bar, normally stands a little rearward of the rearmost line of unit pins $c^5$, with its forward edge at such elevation that when the operating carriage is moved forward, it will pass under the lower ends of such of the unit pins as have not been forced downward or set, but will engage any and all unit pins of the several register bars, which have been pushed downward or set. As is evident, when the register bars are moved forward into action on the register wheels, under the forward movement of the operating carriage, and by action of the push bars $c^9$ on the set unit pins, the register bars will be given differential movements, unless the unit pins of like value have been set on all of the register bars.

Under returning movement of the operating carriage, the bar $c^{10}$ thereof engages the depending lugs $c^3$ of the forwardly-moved register bars and returns said bars to their normal positions.

Mounted in suitable bearings on the sides of the computer case 30, and extending above the register bars $c$, is an operating shaft $c^{12}$ having at its right-hand end a rigidly-secured operating lever $c^{13}$, see Figs. 1 and 8, and having inside of the case 30, segmental gears $c^{14}$ and $c^{15}$, the latter of which, as shown in Fig. 10, is of disk-like form. These segmental gears $c^{14}$ and $c^{15}$, see Figs. 8, 10 and 14, mesh with intermediate pinions $c^{16}$, which, in turn, mesh with the teeth of the carriage rack bars $c^7$, and are suitably journaled on the sides of the case 30. As is evident, with these connections, the operating carriage may be moved forward and rearward when desired, by oscillatory movements of the operating levers $c^{13}$. The extreme movements of the operating carriage are limited by set screws $c^{55}$, one seated in a lug $c^{56}$ of one of the rack bars $c^7$, and engageable with a fixed part $c^{57}$ of the case 30, and the other seated in the front end of one of the front guides $c^{11}$, and engageable with the front end of said rack bar, see Fig. 10.

As a means for insuring full strokes of the operating lever $c^{13}$ and full or complete movements of the operating carriage, I provide an automatically reversible clutch device, the construction of which I believe to be broadly new. The preferred construction of this full stroke device is illustrated in Figs. 8, 36, 37, 40 and 41. In the application thereof to this machine, the disk-like segmental gear $c^{15}$ on the operating shaft $c^{12}$ is recessed to receive and work rotatively on the outer portion $c^{17}$ of a hub $c^{18}$, which, as shown, is rigidly secured by screws $c^{19}$ to a thickened portion of the adjacent side of the case 30. The hub portion $c^{17}$, which is of greater diameter than the inner portion of the hub $c^{18}$, is cut away on both sides to form reversely-extended eccentric cam surfaces $c^{20}$, between which and the inner cylindrical surface of the gear $c^{15}$, reversely-acting clutch rollers $c^{21}$ are arranged to work. Small coiled springs $c^{22}$ held in seats in the hub flange $c^{17}$, tend to force the respective rollers $c^{21}$ into operative positions, to-wit, into engagement with the converging surfaces of the gear $c^{15}$ and of the cam $c^{20}$. A so-called clutch-reversing lever $c^{23}$ is pivotally mounted on the reduced body portion of the hub $c^{18}$, and anti-friction bearing balls $c^{24}$, shown as spaced by a ring $c^{25}$, are preferably interposed between the said hub $c^{18}$ and the ring-like hub of said lever $c^{23}$. The ring-like hub of said lever $c^{23}$ carries laterally-projecting pins $c^{26}$ that are adapted to be engaged, one with each of the rollers $c^{21}$. In its lower end, the lever $c^{23}$ is provided with two notches $c^{27}$, with which a spring-pressed ball $c^{28}$, mounted in a bearing $c^{29}$ on the side of the case 30, is adapted to be engaged to yieldingly hold said lever in either of two positions. The gear $c^{15}$ is shown as provided with two laterally-projecting pins $c^{30}$, that are adapted to engage stop screws $c^{31}$ seated in lugs $c^{32}$ on the opposite sides of said reversing lever $c^{23}$. At its upper end, said lever $c^{23}$ is shown as provided with a finger-piece $c^{33}$, by means of which said lever may, when desired, be moved by hand.

When the lever $c^{23}$ is set in the position shown in Fig. 37, the right-hand clutch roller $c^{21}$ is forced against the tension of its spring into an inoperative position, while the left-hand clutch roller $c^{21}$ is rendered operative by its spring, so that the gear $c^{15}$ may be freely rotated in the direction of the arrow marked on Fig. 37, but cannot be moved in a reverse direction until it has made it complete or full oscillatory movement in the direction stated. At the limit of the movement of the said gear $c^{15}$ in the direction stated, the right-hand pin $c^{30}$ engages the right-hand set screw $c^{31}$, and thereby forces the lever $c^{23}$ into its other position, in which position the left-hand clutch roller $c^{21}$, by engagement therewith of left-hand pin $c^{26}$, will be forced into an inoperative position, and the right-hand clutch roller $c^{21}$ will be released, and hence, thrown into operative position by its spring $c^{22}$. By this automatic reversing action, full and complete movements of the operating lever $c^{13}$ are required or made necessary, and the said lever, and hence, the operating carriage, cannot possibly be moved part way in one direction and then back again, unless the reversing lever $c^{23}$ be intentionally reversed by hand, which will, of course, be a very unusual operation, and not a part of the ordinary action of the machine.

As an adjustable means for imparting variable return movements to the typewriter carriage, or, in other words, for bringing the typewriter carriage to different desired normal positions toward the right, under constant predetermined movements of the operating lever and of the operating carriage of the computer, I provide a variable throw device, which, in itself, I believe to be broadly new. This variable throw device is best shown in Figs. 1, 2, 3 and 8.

Describing this device, a flexible connection, such as a tape $c^{34}$, is attached to the free end of the typewriter line-feed lever 21, and is passed over a guide sheave $c^{35}$ on an arm or lug $c^{36}$ of the typewriter frame, and is then passed downward, and secured to, and adapted to be wound upon, a grooved slack take-up wheel $c^{37}$. This wheel $c^{37}$ is suitably mounted on the adjacent side of the computer frame 30, and carries a spur pinion $c^{38}$, that meshes with a spur gear $c^{39}$ that is loosely journaled on the operating shaft $c^{12}$ adjacent to the operating lever $c^{13}$. The said operating lever $c^{13}$ also carries a loose spur pinion $c^{40}$, that meshes with said gear $c^{39}$ and is adapted to be engaged with a similar spur pinion $c^{41}$, which latter also meshes with said gear $c^{39}$, and is loosely journaled in the outer extremity of a bifurcated supporting arm $c^{42}$, which, as shown, straddles the said gear $c^{39}$ and is loosely journaled on the operating shaft $c^{12}$.

Preferably, the wheel $c^{37}$ is under tension from a light coiled spring (not shown), but which tends to rotate the same in the direction of the arrow marked thereon in Fig. 3, so as to keep the tape $c^{34}$ free from slack. Preferably also, the supporting arm $c^{42}$ engages the pinion $c^{41}$, under sufficient friction to prevent the said arm from being accidentally moved from any set position on the gear $c^{39}$. However, the said arm $c^{42}$ may be easily moved so as to set the pinion $c^{41}$ in any desired position on the gear $c^{39}$, and hence, normally any desired distance from the pinion $c^{40}$ that is carried by the operating lever $c^{13}$.

As is evident, when the operating lever $c^{13}$ is moved forward from its normal position, shown in Fig. 3, the typewriter carriage will remain stationary in its position toward the left, in respect to Fig. 1, until the pinion $c^{40}$ runs into engagement with the pinion $c^{41}$, whereupon the two pinions, by their opposing action or tendency to rotate the gear $c^{39}$, will lock said gear to the operating lever $c^{13}$, so that the subsequent or continued forward movement of said operating lever will positively rotate said gear $c^{39}$, the pinion $c^{38}$ and wheel $c^{37}$, and thereby return the typewriter carriage to a position at the right, that depends on the position in which the pinion $c^{41}$ is normally set in respect to the pinion $c^{40}$. Otherwise stated, the nearer said pinion $c^{41}$ is normally set to the pinion $c^{40}$, the farther toward the right will be the position to which the typewriter carriage will be returned, under a complete forward movement of the operating lever $c^{13}$ and of the operating carriage.

It is evident that the frictional engagement between the pinion $c^{41}$ and its supporting arm $c^{42}$ is not required to prevent movement of said pinion and arm in respect to the gear $c^{39}$, when the two pinions $c^{40}$ and $c^{41}$ are engaged, for it is well understood that two pinions or gears engaged with each other and with a third pinion or gear, will interlock, so that no one of the three can rotate in respect to the other.

Such unit pins $c^5$ as have been pressed downward or set in one operation, for operative action on the register, must of course be restored to normal positions before starting a new line. This is accomplished by means best shown in Figs. 9, 14, 16, 18, 38 and 39. A pair of rods $c^{43}$ are extended transversely of the case 30 below the register bars, and at their ends are mounted in the sides of said case. For each register and group of register bars, there are loosely journaled on the rods $c^{43}$ small bell cranks $c^{44}$ connected in pairs by sleeves $c^{45}$. The depending arms of the front and rear bell cranks are connected by links $c^{46}$, so that all the bell cranks are connected for common oscillatory movements. The upper arms of the four bell cranks are pivotally connected to depending lugs of a unit pin-restoring platform $c^{47}$ that directly under-lies all of the coöperating unit pins, when the register bars are in their normal positions, and which, when moved vertically is held always in a true horizontal position by said bell cranks.

The front rod $c^{43}$ serves as a rock shaft and is provided with a short arm $c^{48}$ that is adapted to engage a projecting arm $c^{49}$ of the platform $c^{47}$. This arm $c^{49}$, as shown in Figs. 38 and 39, is riveted at its inner end to the central portion of the platform $c^{47}$, and its free end is made adjustable in respect thereto by a set screw $c^{50}$. When the arm $c^{48}$ is moved upward into engagement with the arm $c^{49}$, it will raise the platform $c^{47}$, and the latter will restore to normal positions all of the set unit pins; and to accomplish this, at the final part of the return movement of the operating carriage, and at a time when all the unit pins are directly over the said platform, the forward rod $c^{43}$, which serves as a rock shaft, is provided with a cam arm $c^{51}$ that is adapted to be engaged by a spring-held cam-acting dog $c^{52}$, which, as shown in Fig. 14, is pivoted to the left-hand rack bar $c^7$ of the operating carriage. To very accurately adjust the time of action of the said cam dog $c^{52}$ on the said cam arm $c^{51}$, it is shown as provided with an arm having a set screw $c^{53}$ that is normally spring-held against a clip $c^{54}$ on the said rack bar $c^7$.

As is evident, at the final part of the return movement of the operating carriage, the cam dog $c^{52}$, acting on the arm $c^{51}$, will raise the platform $c^{47}$, as above stated; while under initial forward movement, the said dog will simply turn backward and pass under the said arm $c^{51}$, without moving the latter. The said platform $c^{47}$, as will be hereinafter noted, constitutes part of the so-called error-correcting device, and also serves to restore into normal position, a single, so-called, zero pin carried by a sliding bar of the zero devices.

*Decimal-order-selecting mechanism.*—This decimal-order-selecting mechanism is shown in many of the views of the drawings, but attention is first particularly called to Figs. 1, 2, 3 and 11 to 13 inclusive. For each register and coöperating set of register bars, there is a selecting dog $f$, sometimes designated as a decimal-order-selector, which is carried by the typewriter carriage, and there is also a group of so-called denominational selecting levers or jacks $f^1$, equal in number to the number of coöperating register bars, and arranged to be engaged in succession by the said selecting dog, and operative through connections including so-called transposing bars, to lift the register bars, in succession, from left toward the right, under movement of the typewriter carriage from right toward the left. Also in the group of selecting levers, there are other levers preferably of identically the same construction, designated by the letter $g$, to-wit, as shown, two in number, which constitute elements of the so-called punctuation-space key-locking mechanism. Hence, in each group of levers shown in the drawings, there are, as shown, ten levers.

In the application of this improved decimal-order-selecting mechanism, the typewriter frame 1 is provided, at its upper rear corners, with rearwardly and upwardly extended, laterally-spaced arms $f^2$, that rigidly support a transverse rod $f^3$; and in front of the arms $f^2$, a pair of laterally-spaced, upwardly and rearwardly extended arms $f^4$ (Figs. 4 and 11) are rigidly secured to the rock shaft 9, to which, it will be remembered, the vertically movable arms 8 of the vertically adjustable supplemental section $2^a$ of the typewriter carriage are rigidly secured. These arms $f^4$ support a pair of transverse rods $f^5$ and $f^6$, the former of which has two longitudinally-extended grooves, and the latter of which has longitudinally-spaced notches that correspond in the distance of their spacing to the escapement movement of the typewriter carriage.

The selecting dog $f$ is spring-held in its normal position, and is pivotally mounted in the rearward projecting end of a supporting block or arm $f^7$, that is pivotally mounted on the rod $f^5$ and is capable of sliding adjustments thereon. At its free end, said block $f^7$ is provided with a depending tooth $f^8$, see Figs. 11 and 12, that engages a notch of the rod $f^6$, to lock said arm against sliding movements on the rod $f^5$. In a recess of said arm $f^7$, is a spring-pressed ball $f^9$ that normally engages the lower groove of the rod $f^5$, and holds the said arm $f^7$ down, with the selecting dog $f$ thereof in position for action on the forward ends of the levers $f^1$ and $g$, under the step-by-step movement of the typewriter carriage from right toward the left. Under movement of the typewriter carriage from left toward the right, said selecting dog $f$ will move pivotally, and pass free under the forward ends of said levers $f^1$ and $g$. By reference to Fig. 12, it will be noted that the selecting dog $f$, at its upper end, is beveled so that it inclines in the direction of the operative movement of the typewriter carriage, and it will also be noted that the forward ends of the levers $f^1$ and $g$ are beveled in the same direction, for engagement therewith, so that the selecting dog will lift directly upward the engaged ends of said levers, under the operative movement of the typewriter carriage.

The supporting block $f^7$, when moved pivotally upward, so that its spring-pressed ball $f^9$ engages the upper groove of the rod $f^5$, will be held in a position to clear the levers $f^1$ and $g$, and its selecting dog $f$ will then, of course, be rendered inoperative. The supporting block $f^7$ is provided with a pointer $f^{10}$, that works over a scale bar $f^{11}$ attached at its ends to the arms $f^4$, and coöperates with the said scale, to indicate the transverse position of the sheet of printed matter.

To support each group of levers $f^1$ and $g$, a pair of laterally-spaced bearing plates $f^{12}$ are rigidly secured to the fixed supporting rod $f^3$, and the upper portions of these plates $f^{12}$ are connected by two parallel rods $f^{13}$ and $f^{14}$, upon the former of which the said levers $f^1$ and $g$ are intermediately pivoted. The rod $f^{14}$ acts as a stop to limit the downward movement of the forward ends of the levers $f^1$ and $g$, and it is preferably notched so as to assist in spacing the said levers, which levers are primarily spaced by suitable collars or washers on the rod $f^{13}$. The forward ends of the said levers $f^1$ and $g$ are spring-pressed downward by means hereinafter noted. The rods $f^{13}$ and $f^{14}$ have slight longitudinal adjustments for the purpose of correctly locating the levers $f^1$ and $g$ with respect to the selecting dog $f$.

In the arrangement shown in Figs. 9 and 27, for instance, the punctuation-space levers $g$ are the fourth and eighth levers, counted from the right toward the left. These levers $f^1$ and $g$, at their rear ends, rest directly upon light push rods $f^{15}$ and $g^1$ respectively, and the lower ends of these rods are pivotally connected to rearwardly-extended arms of lower selecting levers $f^{16}$ and bell-crank levers $g^2$ respectively, which levers $f^{16}$ and $g^2$ are pivotally mounted on a short transverse rod $f^{17}$ rigidly supported by the rear portion of the computer case 30. These levers $f^{16}$ and $g^2$ correspond in their arrangement to the levers $f^1$ and $g$, that is, the bell cranks $g^2$ are the fourth and eighth members, counted from the right toward the left. The upper ends of the rods $f^{15}$ and $g^1$ are detachably supported by a notched guide plate $f^{18}$ secured to the bearing plates $f^{12}$, and by a coöperating bail $f^{19}$, the arms of which are pivoted on the rod $f^{13}$, as best shown in Figs. 11 and 13. The lower ends of said rods $f^{15}$ and $g^1$ are adjustably and detachably connected to their respective levers $f^{16}$ and $g^2$ by means of coupling heads $f^{20}$. The upper ends of these coupling heads $f^{20}$ are shown as split and provided with threaded seats into which the lower ends of said rods are screwed, and by which the said rods are frictionally held against accidental rotation. The lower ends of said coupling heads are bifurcated so that they straddle the rear ends of said levers, and they are provided with pins $f^{21}$ that loosely rest in notches or open seats $f^{22}$ formed in the rear ends of the said levers $f^{16}$ and $g^2$.

By reference particularly to Figs. 26, 27 and 29, it will be noted that the lower selecting levers $f^{16}$, in a direction from right toward the left, project successively farther and farther forward, and at their rear ends are correspondingly lengthened, so as to maintain, in each lever, the same relative length of front to rear end.

Extending transversely of the said levers $f^{16}$ and of the register bar $c$, overlying the former and underlying the rear end portions of the latter, is a series of eight parallel so-called transposing bars $f^{23}$. These transposing bars $f^{23}$ are supported for vertical parallel movements by pairs of bell cranks $f^{24}$ mounted on rods $f^{25}$ supported by the guide plate $c^1$. Preferably also the lower arms of the pairs of bell cranks $f^{24}$ are connected by links $f^{26}$. As shown in Fig. 29, the left-hand bell cranks $f^{24}$ limit the downward movements of the respective transposing bars $f^{23}$. Each transposing bar $f^{23}$ is connected, by a coiled spring $f^{27}$, to its underlying link $f^{26}$ that serves to yieldingly hold the former downward or in its normal position. These springs $f^{27}$ afford the yielding means referred to above, for holding the respective selecting levers $f^1$ in their normal positions.

Each transposing bar $f^{23}$ has a depending lug $f^{28}$ and an upwardly-extended lug $f^{29}$. The lugs $f^{28}$ directly overlie the upturned forward ends of the lower selecting levers $f^{16}$, and the lugs $f^{29}$ directly underlie the rear ends of the register bars $c$. More definitely stated, in the arrangement shown, the upturned end of the right-hand selecting lever $f^{16}$ is arranged to engage the lug $f^{28}$ of the rearmost transposing bar $f^{23}$, and the lug $f^{29}$ of this rearmost transposing bar is arranged to engage and lift the left-hand register bar $c$; and the left-hand selecting lever $f^{16}$ is arranged to engage the lug $f^{28}$ of the most forward transposing bar $f^{23}$, and the lug $f^{29}$ of this forward transposing bar is arranged to engage and lift the right-hand register bar $c$. Stated still in another way, the said lugs $f^{28}$ are alined obliquely in one direction, and the lugs $f^{29}$ are alined obliquely in the other direction, and are so correlated to each other and to the selecting levers $f^{16}$ and register bars $c$ that the said register bars will be raised, under movement of the typewriter carriage from the right toward the left, in succession from the left toward the right, into position to present their unit pins to the action of a depressed unit bar. The rod $f^6$ is made vertically adjustable by opposing set screws $f^{30}$, one of which is shown in Fig. 11 seated in the ends of the arms $f^4$. At its left-hand end, the rod $f^5$ is reduced at $f^{31}$, see Fig. 1, and the hubs of the blocks $f^7$ are provided with open notches $f^{32}$, see Fig. 11, so that the said blocks may be removed from said rod when moved to the left-hand end of the latter.

As shown in Fig. 2, the rods $f^{15}$ and $g^1$ are normally covered by detachable sheet metal channel plates $f^{33}$.

*Punctuation-space key-locking devices.*—These devices have already been described in part, and further described, are as follows: The long upwardly-extended arms of the two bell cranks $g^2$ are pivotally connected to the rear ends of forwardly-extended connecting links $g^3$, the front ends of which are attached, by slot-and-pin connections $g^4$, to the free ends of upwardly-extended arms $g^5$ rigidly secured to a rock shaft $g^6$, see Figs. 9, 15, 16 and 17, that is mounted in suitable bearings on the end portions of the unit bar frame $b^2$. This rock shaft $g^6$ has a forwardly-curved lock arm $g^7$, the reduced free end $g^8$ of which is adapted to be forced between two of the rockers $b^{15}$, but normally stands in an inoperative position below same, as best shown in Figs. 16 and 17. When the said end $g^8$ of the lock arm $g^7$ is forced between the said rockers $b^{15}$, all play between the rockers will be taken up, so that no one of the numeral keys can be depressed to an extent sufficient to cause the printing of a numeral in the punctuation space. A coiled spring $g^9$, shown in Fig. 17, yieldingly holds the lock arm $g^7$ and the two arms $g^5$ in their normal positions.

When the selecting dog $f$, under the operative movement of the typewriter carriage, engages and depresses one of the punctuation-space levers $g$, it is evident that the connected bell crank $g^2$ and connecting link $g^3$ will be moved rearward, thereby rocking the shaft $g^6$ and throwing the lock arm $g^7$ into its numeral-key-locking position just above noted. It is evident, however, that the slot-and-pin connections $g^4$ will prevent the other connecting link $g^3$ from being forced rearward at such time, or, in other words, that either one of the said connecting links may be rendered operative to move the said rock arm $g^7$, without requiring movement of the other connecting link and its bell crank $g^2$.

*Zero devices.*—For this mechanism attention is particularly called to Figs. 8, 10, 19, 20, 21, 31, 32 and 37. At the left-hand side of each series of register bars $c$ is a zero bar $k$ of the same construction as said register bars, mounted to slide in the same way, but provided with only a single vertically-movable yieldingly-held pin $k^1$, which is of the same construction as the unit pins, but performs a different function. This zero pin $k^1$ normally stands directly under the rearmost side bar of the unit bar frame $b^2$, see particularly Fig. 21. The zero bar, like the register bars, is capable of being raised at its rear end by different means however, and it is provided with a shoulder $k^2$ and with a lug $k^3$ that correspond respectively to the shoulder $c^4$ and lugs $c^3$ of said register bar.

Located below the zero bar $k$ is a long lever $k^4$ that is intermediately pivoted on a transverse shaft $k^5$ mounted on the case 30, and the rear end of which normally stands upon the rods $c^{43}$, as best shown in Fig. 31. This lever $k^4$ has a lateral projection $k^6$ that immediately underlies the intermediate portion of the zero bar $k$. At its front end, the lever $k^4$ works in a vertical slot of a front bar $30^b$ supported by the case 30, and is provided with a head $k^7$ that is normally engaged by the roller-equipped upper end of a lock lever $k^8$, which, as shown, is pivoted to a bearing $k^9$ on said bar $30^b$ and is subject to a spring $k^{10}$ that yieldingly holds said lever in its normal lever-locking position, best shown in Fig. 31.

The zero key proper $k^{11}$, which is of the push key type, is shown as provided with a large head that works through the top plate of the case 30 at the front thereof, and is provided with a stem that slides through the bar $30^d$ of said case, and has a rigidly-secured depending lock-tripping finger $k^{12}$. The key $k^{11}$ is yieldingly-pressed upward, by a coiled spring $k^{13}$, applied to the stem thereof and to the said bar $30^d$. A lever-actuating coiled spring $k^{14}$ connects the front end of the lever $k^4$ to the said finger $k^{12}$. Inside of the spring $k^{14}$ is a loose rod $k^{15}$.

The operation of this improved key mechanism is as follows: When the zero key $k^{11}$ is depressed, the first effect thereof is to stretch the spring $k^{14}$, the lever $k^4$ being then held by the lock lever $k^8$ so that it temporarily affords a fixed base of re-action for the said spring; and then after the said spring $k^{14}$ has been put under tension, the projecting portion of the finger $k^{12}$ strikes the free lower end of the lock lever $k^8$, thereby rocking the same so as to release the lever $k^4$, whereupon the said spring $k^{14}$ imparts a quick upward movement to the rear end of the said lever $k^4$. This movement of said lever $k^4$ raises the rear end portion of the zero bar $k$ and sets the zero pin $k^1$, by thrusting the same upward against the overlying rear bar of the unit pin frame bar $b^2$, and it also positions the rear end $k^{16}$ of said lever in front of the so-called push bar $c^9$ of the operating carriage, so that the said operating carriage cannot possibly be moved forward, from its rearmost or normal position, until after the zero key $k^{11}$ and said lever $k^4$ have been returned to normal positions, subsequent to the removal of the finger from the said zero key. When the zero pin $k^1$ is thus set, and the zero bar $k$ is subsequently dropped back into normal position, upon the release of the zero key, its lower end will stand in position, like the set unit pins, to be engaged by the push bar $c^9$, under forward movement of the operating carriage. The loose rod $k^{15}$ in the coiled spring $k^{14}$ causes the lever $k^4$ to be positively returned to normal position, when the key $k^{11}$ is restored to its normal position by the spring $k^{13}$.

The improved key mechanism above described insures a full operative movement of the lever $k^4$, and hence, of the zero bar $k$, as is required to effect the proper setting of the zero pin, and furthermore, it produces a clicking action which will clearly indicate, to the operator, when such movement has taken place.

The teeth on the front end of the zero bar $k$ (see Figs. 9 and 19) mesh with a pinion $k^{17}$ that is loosely mounted on the coöperating register wheel shaft $a^1$, and is connected therewith by one-way friction clutch $k^{18}$, that is arranged to cause rotation of said shaft $a^1$ under forward movement of the zero bar and of the operating carriage. This zero bar, unlike the register bars, is, when moved, always given a full movement both forward and rearward, by the operating carriage. As is obvious, the return or rearward movement of the zero bar is accomplished by engagement of the carriage bar $c^{10}$ with the lug $k^3$ thereof.

The so-called unit pin-restoring platform $c^{47}$ is provided with a laterally-projecting portion $k^{19}$, see particularly Fig. 38, that normally underlies the zero pin $k^1$, so that the said zero pin, if set, will be restored to its normal position, whenever the said platform is raised.

It will, of course, be understood that after each column of figures has been added on the register, an additional forward and return movement of the operating carriage is required, to render the zero bar operative on said register.

*Error-correcting device.*—The key mechanism proper of this error-correcting device is identical with that of the zero mechanism above described, and hence the parts thereof may be briefly noted. The push key $p$ is spring-pressed upward by a coiled spring $p^1$, and is provided with a depending tripping finger $p^2$. A lever $p^3$ is intermediately pivoted on the shaft $k^5$, and at its forward end is provided with a head $p^4$ that is normally engaged by a spring-held lock lever $p^5$, the lower end of which is adapted to be engaged by the projection of the trip finger $p^2$, at the final part of the downward movement of the key $p$. A spring $p^6$ connects the finger $p^2$ to the front end of the lever $p^3$, and, like the spring $k^{14}$ of the zero key mechanism, is adapted to be set under tension by the initial downward movement of the key $p$, and to act upon the lever $p^3$, after the latter has been released by an engagement with the finger $p^2$ with the lock lever $p^5$. The rearwardly-projecting free end of the lever $p^3$ is adapted to engage a projecting pin $p^7$ of one of the forward platform-supporting bell cranks $c^{44}$, so that when the said lever $p^3$ is rocked by the spring $p^6$, the platform $c^{47}$ will be raised into an operative position, and thereby restore all set unit pins, and also the zero pin, if the latter happens to be set, to normal positions. By this device, which is, of course, operative at will, unit pins incorrectly set may, where the error is discovered before the operating carriage is moved forward to accumulate the amount on the register, be restored to normal positions, and the number again set up by the proper manipulation of the numeral keys. Of course, the incorrectly printed number on the printed sheet should also be corrected.

There is one error-correcting mechanism, such as above described, for each register. This improved error-correcting device operates under uniform pressure, regardless of the number of unit pins to be restored to normal positions, and furthermore, is well adapted for use in machines having a plurality of registers.

*Safety devices, including carriage-operated numeral key lock; register bar safety lock, operated by error-correcting key and by operating carriage; and carriage-operated transposing bar-depressing device.*—Attention is first particularly directed to Figs. 9, 15, 16 and 18. On a sleeve $1^t$ that is supported by lugs of the frame $b^2$ and surrounds the rock shaft $g^6$ (which shaft as before noted, is mounted on the lower front portion of the unit bar frame $b^2$), is loosely pivoted a depending forward spring-pressed arm $t$ having an upwardly-extended lock lug or finger $t^1$, the reduced upper end of which, will, by the arm actuating spring $t^2$, be forced upward between two of the rockers $b^{15}$, whenever the operating carriage is moved forward from its extreme rearmost or normal position, and thereby lock the numeral keys 5 so that no one thereof can be depressed. When the operating carriage is in its normal position, the carriage bar $c^{10}$ engages the lower end of said lever $t$ and holds the said lock lug $t^1$ in its lowermost or inoperative position, shown in Figs. 16 and 18.

The register bar safety device, which is best shown in Figs. 9, 10 and 14, comprises a transverse bar $t^{10}$ that is carried by laterally spaced arms $t^{11}$ of a transverse rock shaft $t^{12}$, mounted at its ends in the sides of the case 30, and provided with depending arms $t^{13}$ connected by a transverse rod $t^{14}$. The rod $t^{14}$ is normally engaged by the shoulder $t^{15}$ of a long tripping bar $t^{16}$, the rear end of which is arranged to slide through the transverse angle bar $30^a$ of the case 30, and the front end of which is pivotally connected to an arm $t^{17}$ of a rock shaft $t^{18}$, the ends of which are journaled in the sides of the case 30. A light coiled spring $t^{19}$, see Fig. 10, yieldingly draws the bar $t^{16}$ forward and holds the rod $t^{14}$ engaged with the shoulder $t^{15}$ of the tripping bar $t^{16}$. The rock shaft $t^{18}$ has forwardly projecting arms $t^{20}$ that are directly subject to the lower ends of the stems of the error correcting keys $p$, as best shown in Fig. 10. The upper end of the arm $t^{17}$ is subject to a cam $t^{21}$, that is carried by the tens-carrying shaft $a^{14}$ of the register mechanism.

Normally, the safety bar $t^{10}$ stands in such position that the shoulders $c^4$ and $k^2$ of the register bars $c$ and of the zero bar $k$, will clear the same and thus permit the said bars to be raised at their rear ends as required for the setting of the unit pins and of the zero bar pin. When however, the error correcting key is depressed, the arm $t^{17}$ will be forced forward and through the link $t^{16}$, acting on the rod $t^{14}$, will cause the safety bar $t^{10}$ to move slightly rearward, and thereby overlie the shoulders $c^4$ and $k^2$ of the said register bars $c$ and zero bar $k$. Also, since the tens carrying shaft is connected to pinion $a^{16}$ by a one-way clutch and through gear $a^{17}$, meshing with pinion $a^{16}$ and the rack $c^7$ of the operating carriage, said shaft $a^{14}$ and the cam $t^{21}$, thereon, will not turn during the forward movement of the operating carriage, but on its return movement, the clutch will lock the shaft $a^{14}$ to pinion $a^{16}$ and be rotated, together with cam $t^{21}$ in the direction of the arrow shown in Fig. 10; and the cam $t^{21}$ acting on arm $t^{17}$ and through the link bar $t^{16}$ and rod $t^{17}$, will move the said safety bar $t^{10}$ over the shouldered portions $c^4$ and $k^2$ of the said register bars and zero bar. This safety bar $t^{10}$ thus serves to positively lock in their normal positions, and against vertical movement, the rear ends of the register bars and zero bar, so that the said bars cannot be raised while their pins are being restored to normal positions, by the upward movement of the platform $c^{17}$ and its projection $k^{19}$, which as already stated takes place just before the operating carriage is returned to normal position. Otherwise stated, the said safety bar $t^{10}$ will hold down the register bars and zero bar while the set unit pins and zero pin (if the latter should happen to be set) are being restored to normal positions, under the control of the error-correcting key, or while the said pins are being restored to normal positions after each operation, under the return movement of the carriage. It is obvious from the foregoing description, that the register bars are locked against vertical movements if hand-lever $c^{13}$ is only partially restored to its normal position, with the result that the type-writer carriage would be blocked in its operative movement as soon as the selecting dog $f$ comes in contact with one of the selecting levers $f^1$, because the forward ends of the latter cannot be raised unless the register bars $c$ can be lifted at the same moment, which stoppage gives notice to the operator that something is wrong, which must be remedied, by pushing the hand lever farther back, before he can proceed with the work.

In the description of the typewriter, brief mention has been made in regard to shift-key locking mechanism which prevents the supplemental carriage $2^a$ from rising, when in normal position, and that this feature has an important relation to the decimal-order selecting mechanism, which feature will now be explained.

By referring to Figs. 3 and 4, it will be remembered that the supplemental carriage $2^a$ is supported by arms 8, the latter are mounted on the rock shaft 9, on which are also mounted the rearwardly extended arms $f^4$, carrying the two rods $f^5$ and $f^6$, on which the selector block or arm $f^7$ is slidably mounted.

The action of the shift keys 6 on bell cranks 12, guide rod 11 and wheel 10, serves to raise the supplemental carriage $2^a$ as heretofore noted, and thereby slightly rotates rock shaft 9 in such manner that the free ends of arms $f^4$ are tilted downward sufficiently to cause selecting dog $f$ to pass under and clear of levers $f^1$. If there were no preventive means said selecting dog $f$ might pass under said levers $f^1$ without operating on, or lifting, the latter sufficiently to raise the register bars high enough to present the unit pins to the key-actuated unit bars $b^7$, when said carriage $2^a$ is in its normal position, because the resistance of all the parts operated by said levers $f^1$ might overcome the force which holds the supplemental carriage $2^a$ in such position, and thus would cause the arms $f^4$ to be tilted downward, thereby reversing the intended action of the dog $f$ and levers $f^1$, so that the latter becomes operative on the former instead of the dog being operative on the latter. Such action, however, becomes impossible when the lock mechanism described is in the normal position shown in Fig. 4, in which position the supplemental carriage $2^a$ is prevented from rising and rock shaft 9 prevented from rotation, by lock pin 15 resting in the rear upwardly-extended notch of cam slot 16, until released by the action of one of the shift keys 6 when depressed.

If, from any cause, the so-called transposing bars $f^{23}$, or any one thereof, should happen to be held in a raised position (as would happen if the selecting dog $f$ should remain in engagement with one of the selecting levers $f^1$ while the operating carriage is being given a return movement), the rear ends of the register bar would engage and bend or break the upwardly extending lugs $f^{29}$ of such raised transposing bar. To prevent this, a depressing arm $t^{22}$ is secured to a rock shaft $t^{23}$ (see particularly Figs. 8 and 26), and this rock shaft is provided with a down turned arm $t^{24}$ that engages in a notch $t^{25}$ formed in one of the rack bars $c^7$ of the operating carriage. Normally, the depressing arm $t^{22}$, the end portion of which overlies the several transposing bars $f^{23}$, stands high above said bars, as shown in Fig. 26. When, however, the operating carriage is given its forward movement, the said arm $t^{22}$ is forced downward onto the said transposing bar $f^{23}$, and positively depresses the same to their normal positions, with their lugs $f^{29}$ below the rear ends of the register bars. When the said transposing bars are thus positively forced downward to their normal positions, while their selecting lever is engaged by the selecting dog, the corresponding connecting rod $f^{15}$ will necessarily be sprung and buckled slightly, to permit such movement, but will assume its original shape as soon as the pressure is removed. The depressing arm $t^{22}$ is held in normal position by spring $t^{26}$, one end of which is attached to the rock shaft $t^{28}$, and the other to case 30.

Referring to Figs. 1, 3 and 35, in which is shown a reversible register decimal-order indicator, $m^1$ indicates the indicator, $m^2$ the differentially-spaced pointers, $m^3$ buttons for holding the indicator when reversing its position, $m^4$ locking pins extending down through the casing or top cover of the computer, $m^5$ a bar fastened to the underside of the top cover, $m^6$ a recess in each end of said bar, and $m^7$ two spring-pressed balls in the ends of bar $m^5$, said balls engaging the reduced portions on locking pins $m^4$ for holding the indicator on the top cover. The recesses in bar $m^5$ are slightly reduced at the ends of said bar so that the balls cannot fall out when the indicator is removed.

*Operation.*—The operation of the machine above described, in most respects, is probably clear from the detailed description of the different groups of mechanisms, and the statements made as to the operation thereof. It is thought, however, that the following remarks and further statements of operations will be found serviceable. Several items of a bill or invoice may be listed, and the amount added; and numbers may be added and listed in several vertical columns. The numeral keys can be used for printing numerals, without adding the same, in any place, except in the so-called adding zones. For instance in making out a bill or invoice, including an item, such as 10 lbs. sugar @ 5¢ per lb. .50 the numeral keys when used to print numbers in connection with the item, will not actuate the computing mechanism, because the selecting dog will then be out of the adding zone, or in other words, will not be in a position for action on any one of the selecting levers. When, however, the selecting dog is in position for action on one of the selecting levers $f^1$, and one of the numeral keys is then depressed, the said depressed key operates, through the unit-bar mechanism described, to set the corresponding unit pin in a lifted register bar.

The several registers and coöperating preliminary representation devices, are, of course, provided for the purpose of adding and listing numbers in several vertical columns. This also requires that the selecting dogs, which operate on different groups of levers, and also the corresponding ends of the said groups of levers, be set for engagement on different lines, so that each dog will operate only on its coöperating levers and will clear the levers of the other groups. This is preferably done by varying the lengths of the selecting levers $f^1$ in the several groups, as best shown in Fig. 1, by reference to which it will be noted, that the levers of the right-hand group are shorter, while the levers of the left-hand group are longer than the levers of the intermediate group. It will also be noted that the several selecting dogs are correspondingly mounted in the supporting blocks, or in other words, are offset so that they will engage only with the ends of the levers of corresponding groups, and furthermore, that just to the rear of the extreme forward ends, the said levers are undercut, leaving beveled teeth at the forward ends thereof, in the path of travel of coöperating selecting dogs, and affording clearance for the other dogs past the said beveled tooth portions, either in front or to the rear thereof. Also the supporting blocks $f^7$ should be so spaced that no two selecting dogs $f$ will operate under coöperating groups of levers at the same time, but will operate under different portions of the operative movement of the typewriter carriage.

With the arrangement of selecting levers $f^1$ and the punctuation levers $g$ described, it is a very easy matter to vary the kind of punctuation that will be done. It should be remembered that selecting levers $f^1$, and punctuation levers $g$ are identical in construction, and so are the rods $f^{15}$ and $g^1$, and that the lower levers $f^{16}$ and bell cranks $g^2$ are for two different purposes, viz: to lift the register bars and lock the numeral keys when the punctuation space is opposite the printing point. Such being the case, it follows that the action of selecting dog $f$ on levers $f^1$ and $g$, and transmitted to levers $f^{16}$ and bell cranks $g^2$, can be made variable on the latter, according to the location of the levers $g$, and that such location is determined solely by connecting bell cranks $g^2$, through rods $g^1$ to some of the levers $f^1$, in which case such levers $f^1$ become levers $g$, or eliminating such connection altogether by removing rods $g^1$ from the machine, which is easily done, by turning the free end of bail $f^{19}$ upward, which releases the rods so that they can be removed from the bell cranks by simply lifting them upward from the open seats in the rearwardly extending arms of bell cranks $g^2$.

From this description, it is also easy to understand that levers $f^1$ and $g$ are thus designated for the purpose of explaining their functions only, and that, in case the punctuation is to be changed from denoting dollars and cents to denoting hundreds, thousands and hundreds of thousands, said levers $f^1$ and $g$ will change functions, although remaining in their respective places, depending on the order in which rods $g^1$ are connected to said levers. For instance, with rods $g^1$ arranged as the fourth and eighth members from the right, in respect to Fig.

1, and as the fourth and eighth members from the left, as shown in Fig. 5, and connected to corresponding members or levers, marked $g$, the punctuation will be like this:

$$645{,}387.29$$

With the said rods $g^1$ arranged at their upper ends as the third and seventh members from the right, in respect to Fig. 1, or as the third and seventh members from the left, as shown in Fig. 6, which arrangement is accomplished by crossing rods $g^1$ with rods $f^{15}$, as shown, the lower ends of all the rods remaining in their normal positions, indicated in Fig. 5, making said rods $g^1$ subject to corresponding third and seventh levers from the left, in Fig. 6, thereby causing the punctuation-space key-locking mechanism to be actuated one step in advance of that shown in Fig. 5, hence the punctuation in this case will be like this:

$$64{,}538{,}729$$

With the rods $g^1$ removed, as indicated in Fig. 7, and rods $f^{15}$ arranged as shown, levers $f^1$, act in succession on said rods, and levers $g$, shown as now being at the left-hand side, have no connections with bell cranks $g^2$, hence the punctuation-space key-locking mechanism is not actuated, which permits the figures to be printed solid, like this:

$$64538729$$

The notched guide plate $f^{18}$ and bail $f^{19}$ make the various adjustments of the upper ends of the rods, and their ready connection with or disconnection from any of the levers a very easy matter.

It will be remembered that the punctuation-space key-locking mechanism operates only when the punctuation space on the paper is opposite the printing point, from which it follows that while a numeral cannot be printed in the punctuation space, that the desired mark, such as a comma or period, may, nevertheless, by striking the proper character key, be printed in such space, or this punctuation space on the sheet may be left blank, if desired, by simply striking the space bar.

Before starting to do a piece of work, all the parts must, of course, be in their proper adjustment with respect to the location on the paper of the printed column, or columns, to be added, and for purposes of such adjustment, the tabulating stops of the typewriter are set in proper positions, which determines the location of a column on the paper. Next, the block or arm carrying the selecting dog $f$ is moved longitudinally of its supporting rod until the pointer $f^{10}$ is opposite a number on the scale $f^{11}$ that corresponds with the number on the tabulating stop scale, when the said block is locked with the rod $f^6$, as heretofore described.

In order to regulate the return movement of the typewriter carriage to initial position, for each new line, the right-hand margin stop 25 is set at such point, indicated on the front scale 23, as it is desired to begin a new line, and the pinion supporting arm $c^{42}$ on the operating shaft $c^{12}$ of the computer is so set on gear $c^{30}$, and with respect to the pinion $c^{40}$ on the hand lever $c^{13}$, that a full forward movement of said lever, brings the typewriter carriage against the right-hand marginal stop. The register, or registers, must also be "clear" or at zero, before beginning operations, which is accomplished by pressing the zero keys of the several registers and giving the hand lever a complete forward and backward oscillation.

If only one column is to be added, the selector carrying blocks $f^7$, for the registers, not to be used, are swung to a vertical position, shown by dotted lines in Fig. 11, in which position, the selector is inoperative. If more than one column is to be added, said blocks are adjusted to operative positions, with respect to corresponding tabulating stops, the same as for one column work. The machine is then ready for operation. The general operation of this class of machines is similar to that of the patent to Hanson 905,421, dated December 1, 1908; that is after the numerals are printed, which form a number, the general operator is manipulated as in said patent.

If the operator makes a mistake in depressing the wrong numeral key when writing figures in the adding zone, and becomes aware of such mistake before the amount has been transferred to the register, he can correct it on the paper in the customary way by erasure, and depress the error key of the register, on which the wrong number would be accumulated, if not corrected, which will restore all the set unit pins in the register bars of such register to normal positions, after which the correct number may be rewritten on the paper. On account of the fact that the error key is connected for coöperation with the register-bar locking bar $t^{10}$, the error key cannot be depressed while any register bar is in a raised position, hence, it is necessary to move the typewriter carriage to such position that the selecting dog $f$ is not in operative position on the selecting levers $f^1$. In case a figure is not clearly imprinted on the paper, and it is desired to make such imprint more clear, it is only necessary to adjust the typewriter carriage to the proper position and strike the key a little harder a second time, which will not affect the adding mechanism and add the number a second time, as would be the case if the numbers were added directly by depression of the numeral keys.

The connection heretofore described, whereby the tabulating keys move a shift key, and whereby the movement of either of the shift keys will not move a tabulating key, is important. With this construction, it follows, that when a tabulating key is depressed, the supplemental frame $2^a$ of the typewriter carriage 2 will be raised, through the connections shown in Fig. 4, and the arms $f^4$ will be rocked downward simultaneously with the release of the typewriter carriage from its escapement mechanism, the selecting dogs $f$ will be thrown into positions below the toothed front ends of the coöperating levers $f^1$ and $g$, and hence, will pass under and out of engagement with the same, when the typewriter carriage makes a movement toward the left to a position determined by which one of the tabulating keys is depressed. This avoids unnecessary wear between the selecting dogs $f$ and levers $f^1$ and $g$.

Whenever either of the shift keys is depressed for presenting the paper to the upper-case characters, the connection between the typewriter and adding mechanism is broken, in the manner just described above, by the rocking of arms $f^4$ downward so that the selector dog $f$ passes under and clear of the levers $f^1$ and $g$, thus permitting the use of the upper-case characters on the numeral keys to be printed in the adding zone without affecting the adding mechanism.

The upper-case character on numeral key 6 is generally a short horizontal line like this __, used for underscoring words or passages in the written text, and in connection with the adding mechanism described in this case, can be used for making a line between the column added and the printed total, like this:

```
         24
         36
         50
        ___
        110
``` without affecting the adding mechanism, so that the total shown on the register is not disarranged by using the numeral key for the purpose described.

The same object may also be obtained by swinging selector block $f^7$ to its upward inoperative position. If block $f^7$ is not so positioned before printing the total, the adding mechanism is affected, by setting up a number on the preliminary representation devices corresponding to the total, which can be eliminated by depressing the error key.

In further explanation of the operation of the device, and in explanation of some of the claims, it may be noted that with a plurality of registers, a general operator, and selecting dogs $f^7$ adjustable to operative or inoperative position, the typewriter carriage during its run acts to determine whether one register, or any plurality, may compute the same individual item set up on the preliminary representation devices. Furthermore, owing to the fact that the dogs $f^7$ are not only adjustable along the carriage but also adjustable to operative or inoperative position at any point laterally of the carriage, and also due to the fact that the groups of denomination members or selecting jacks are spaced apart, it is possible to utilize different sets of jacks in computing successive numbers during the run of the carriage, so that two or more columns may be printed by the keys and the columns computed in separate registers; and furthermore these columns may be printed anywhere on the work sheet. Due also to the fact that the dogs $f^7$ may be adjusted to coöperate with different groups of jacks simultaneously during the carriage run, and due also to the fact that any register may be individually brought to zero condition, it is possible to do subtotaling and grand totaling by computing the same number with the aid of two sets of denominational members or jacks, thus carrying the same number into a plurality of registers and then clearing any register, while any other register or registers carries the total.

Variations may be resorted to within the scope of the invention, and portions of the improvements may be used without others.

Having thus described my invention, I claim:

1. In a computing machine, the combination with a plurality of registers, of register-actuating mechanism including a decimal order selecting dog and a coöperating group of denominational-determining members for each register, the said selecting dogs being arranged to engage their coöperating denominational-determining members on different lines, so that each selecting dog will act only upon its own coöperating group of denominational-determining members.

2. In a computing machine having a key-controlled traveling carriage, a plurality of independent registers, corresponding independent preliminary representation devices for action on said registers, a common set of keys with connections for setting the several preliminary representation devices, and corresponding decimal-order-selecting mechanism, each comprising a selecting dog on said carriage, and a group of denominational-determining members acted upon in succession by said selecting dog, and having connections operating to present the decimal orders of the corresponding preliminary representation devices successively to the action of said key-controlled setting connections, the said several selecting dogs and their coöperating groups of denominational-determining members having engagement on lines offset transversely of the direction of the movement of said carriage, so that each selecting dog will act only upon its own coöperating group of denominational-determining members.

3. In a computer, the combination with a stationary register having decimal orders, of a traveling paper supporting carriage, keys controlling the step-by-step movements of said carriage, a decimal-order selector carried by said carriage, and case-shifting mechanism for rendering said selector inoperative.

4. In a combined typewriter and computing machine, the combination with printing devices, of adding mechanism comprising a register and register-actuating devices, a shift key, a tabulating key, and connections between the tabulating key and the shift key, whereby the operation of either key breaks the operative connection between the printing devices and the register-actuating devices.

5. In a combined typewriter and computing machine, the combination with typewriting mechanism, of adding mechanism comprising a register and register-actuating devices, case-shifting means for the typewriting mechanism, a carriage release and stop mechanism, and connections between said release and stop mechanism and said case-shifting means, whereby the operation of either the shifting means or the carriage release and stop mechanism, automatically breaks the connection between the typewriting mechanism and the register-actuating devices.

6. In a combined typewriter and computing machine, the combination with typewriting mechanism, of adding mechanism, a shift for the typewriting mechanism, a carriage release and stop mechanism, and connections between the shift for the typewriting mechanism and said carriage release and stop mechanism, whereby the operation of the latter operates the former, but the operation of the shift does not affect the carriage release and stop mechanism.

7. In a combined typewriter and computing machine, the combination with typewriting mechanism, including a carriage, escapement mechanism, and release and stop mechanism for said carriage, of adding devices, case shift mechanism for the typewriting mechanism, a plurality of keys adapted to operate the carriage release and stop mechanism for releasing the carriage from its step-by-step controlling escapement mechanism at any point of its travel, and automatically stopping the same at variable predetermined points where it becomes subject to the control of the escapement mechanism, and connections between one of said shift keys and all of the other keys noted, whereby the operation of any of the latter class of keys operates a shift key and its connected shift devices.

8. In a combined typewriter and computing machine, the combination with typewriting mechanism having numeral keys, of a carriage and escapement mechanism therefor, adding mechanism having decimal orders, tabulating keys adapted to release the typewriter carriage from its controlling escapement mechanism and automatically stop the same for connecting any numeral key with the adding mechanism in any desired decimal order, and connections between said tabulating keys and typewriting mechanism for automatically breaking the connection between the typewriter and adding mechanism during the operation of any one of said tabulating keys and for automatically restoring said connection upon the release of said tabulating keys.

9. In a combined typewriter and computing machine, the combination with a plurality of stationary or non-traveling registers having decimal orders, of a traveling carriage, and a plurality of decimal-order selectors, each of which controls the various decimal orders of the corresponding register only, and each of which is adjustable independently of the other, both as to operative and inoperative positions and for timing its selective action.

10. In a computing machine, the combination with adding devices, of an operating carriage, operable to set said devices to zero, a zero device controlling key, and means actuated by said key for locking said carriage in its normal position while said key is in a depressed position.

11. In a computing machine, a register having decimal-order wheels, key-set preliminary representation devices for action on said register, and an operating carriage for rendering the set preliminary representation devices operative on said register, in combination with zero mechanism for restoring the register wheels to zero, including a zero key, and means for locking said operating carriage in its normal position when said zero key is moved from its normal position.

12. In a computing machine, a register having decimal-order wheels, key-set preliminary representation devices for action on said register, and an operating carriage for rendering the set preliminary representation devices operative on said register, in combination with zero mechanism for restoring the register wheels to zero, including a lever, a lock normally holding said lever against movement, a spring for moving said lever, and a zero key operative to first set said spring and then to cause said lock to release said lever.

13. In a computing machine, a register having decimal-order wheels, key-set preliminary representation devices for action on said register, and an operating carriage for rendering the set preliminary representation devices operative on said register, in combination with zero mechanism for restoring the register wheels to zero, including a lever movable to lock said carriage in its normal position, a lock normally holding said lever against movement, a spring for moving said lever, and a key operative to first set said spring, and then to cause said lock to release said lever after its actuating spring has been set under tension.

14. In a computing machine, the combination with a register having decimal-order wheels, of register bars having key-set unit pins, a zero bar having a driving pin and connections for restoring the wheels of said register to zero, an operating carriage for rendering the set unit pins operative on the register wheels and for rendering said zero bar operative on said register wheels when its pin is set, and a zero key mechanism, comprising a lever movable to set the pin of said zero bar and to lock said operating carriage in its normal position, a lock normally holding said lever against movement, a spring retracted zero key, a lever actuating spring connected to said lever and to said key, and a trip controlled by said key and engageable with said lock to cause the latter to release said lever after its actuating spring has been set under tension.

15. The combination with a computing machine having an operating carriage and an operating lever for moving the same back and forth, of a full-stroke device therefor, comprising reversely acting clutches operative thereon, and means whereby, at the limits of the carriage movements, said clutches will be automatically and alternately reversed.

16. The combination with a computing machine having an operating carriage and an operating lever for moving said carriage back and forth, of a full-stroke device therefor, comprising a fixed hub having reversely extended eccentric cam surfaces, a ring carried by said operating lever and surrounding said hub, clutch rollers working between said ring and the cam surface of said hub, springs tending to throw said rollers into operative positions, an oscillatory clutch reversing member movable to alternately throw said clutch rollers into inoperative positions, means yieldingly holding said clutch reversing members in its extreme positions, and means whereby the latter will be shifted at the limits of movement of said operating lever and said ring, thereby reversing the action of the clutch device.

17. In a computing machine, a zero key mechanism comprising a lever, a lock normally holding the same against movement, a spring for moving said lever, and a key operative to first set said spring and then cause said lock to release said lever.

18. In a computing machine, the combination with a register and a zero bar having a zero pin, of a lever for effecting the setting of said zero pin, a lock normally holding said lever against movement, a spring for moving said lever, and a key operative to first set said spring and then to cause said lock to release said lever, and thus render said spring operative to move said lever.

19. In a computing machine, a key mechanism comprising a lever, a lock normally holding said lever against movement, a spring retracted key, a lever-actuating spring connected to said lever and to said key, and a trip carried by said key and engageable with said lock, to cause the latter to release said lever after its actuating spring has been set under tension.

20. In a computing machine having key-set preliminary representation devices, an error correcting mechanism operative at will to restore set preliminary representation devices to normal position comprising a platform for engagement with said preliminary representation devices, a lever for moving said platform, a lock normally holding said lever against movement, a spring for moving said lever, and a key operative to first set said spring and then cause said lock to release said spring.

21. In a computing machine, an error correcting mechanism comprising a lever, a lock normally holding said lever against movement, a spring for moving said lever, and a key operative first to set said spring and then cause said lock to release said lever.

22. In a computing machine, the combination with a register having decimal orders, of a decimal-order indicator detachably mounted on the computer case in close proximity to said register.

23. In a computing machine, the combination with a register having decimal orders, of a reversible indicator plate having means for differently grouping the decimal orders of said register to the vision of the operator, and means for detachably locking said indicator plate in either of its two positions.

24. In a computing machine, the combination with a computer case and a register therein, of a reversible indicator plate $m^1$, and having on its opposite edges differently arranged pointers $m^2$, provided on top with buttons $m^3$ for holding the indicator when reversing its positions, and provided with depending head lock pins seated in said computer case, and spring-pressed lock devices on said computer case engageable with the lock pins of said indicator plate.

25. In a combined typewriting and computing machine, the combination with a plurality of registers, of preliminary representation or indexing devices for said registers, a traveling carriage, a general operator for running into the registers the numbers indexed, and means adjustable along said carriage to enable said general operator to actuate any plurality of said registers simultaneously to compute the same individual item set up on said representation devices.

26. In a combined typewriting and computing machine, the combination with a plurality of registers, of groups of preliminary representation or indexing devices, one group for each register; typewriter numeral keys common to all of said groups, a traveling carriage also under the control of said keys, a general operator for running in the registers the numbers indexed, and means adjustable to operative or inoperative positions for bringing any one of said groups under the control of said keys during the carriage run or any two or more groups simultaneously to thereby determine whether the general operator shall run numbers printed in a single column and set up on said representation devices, into one of said registers any two or more simultaneously.

27. In a combined typewriting and computing machine, the combination with a plurality of registers, of preliminary representation or indexing devices for said registers, typewriter numeral keys common to all of said registers, a traveling typewriter carriage also under the control of said keys, a general operator for running into the register the numbers indexed, and means controlled by said carriage during the run thereof, for determining whether said general operator shall run into any one of said registers and which one numbers printed in a single column by said keys; or run into any two or more of said registers the same number simultaneously; or run into separate registers simultaneously different numbers printed in a plurality of columns by said keys.

28. In a combined typewriting and computing machine, the combination of numeral printing typewriter keys, a typewriter carriage controlled by said keys, preliminary representation or indexing devices under the control of said keys, a plurality of registers, a general operator for running into the registers the numbers indexed upon said devices, and denomination-selecting means controlled by said carriage, and including a selector for each register, said selectors individually adjustable either to effect the setting of indexing devices for both registers at the operation of the keys, whereby the numbers written in a single column may be carried into both registers, or to effect the setting of indexing devices for one register after the other at the operation of the keys, whereby numbers written in separate columns may be carried into separate registers; the adjustment of said selectors permitting the location of the adding zones in various positions upon the work-sheet.

29. The combination with a typewriter carriage and typewriter numeral keys to control the same, of a plurality of adding devices, groups of preliminary representation or indexing devices controlling said adding devices, denomination-selecting means operable by said carriage for coöperation with all of said groups of devices, and means for simultaneously setting up numbers coresponding to the value of the numeral keys operated, in different groups of said preliminary representation devices at sundry selectable portions of the run of the carriage.

30. The combination with a plurality of registers, of preliminary representation or indexing devices including numeral keys for controlling said registers, a general operator for running into the registers the numbers indexed under the control of said keys, zeroizing means individual to each register for clearing the same, means under control of said general operator for actuating said zeroizing means for each register separately, or for any plurality of registers simultaneously, and manually-settable means to determine which register or registers shall be set to zero by said general operator.

31. In a computing machine, the combination with a plurality of registers, of register-actuating mechanism including decimal-order selecting dogs, and coöperating groups of denominational-determining members, one selecting dog and one group of members for each register, constructed and arranged so that each dog is operative upon its own set of members, but inoperative upon the remaining members.

32. The combination with a plurality of registers, independent of one another, of a typewriting mechanism, including a carriage movable into and out of a computing zone, and denomination-selectors, one for each register, controlled by said carriage, each selector capable of coöperation only with its own register, whereby the effectiveness of each selector is limited to that portion of the run of the carriage which brings such selector into coöperation with its individual register.

33. A combined typewriting and computing machine, comprising in combinatio . plurality of registers, a single set of printing numeral keys, a set of individually settable preliminary representation or indexing devices for each of said registers, denominational determining members for each of said registers, means acting through the medium of said denominational determining members for enabling said keys to set indexing devices in all of said sets simultaneously during the printing of a number by said keys, whereby the correctness of the number may be ascertained before the registers are operated, and means for subsequently carrying the same number into a plurality of said registers, a single operation of the keys sufficing for all of said registers.

34. In a combined typewriting and computing machine, the combination with a plurality of registers, of a typewriter carriage, a single set of printing numeral keys to control the letter-feeding movements of said carriage, preliminary representation or indexing devices for said registers and inclusive of denomination-selecting devices for said registers, said set of nine keys being common to said registers, and said indexing devices being settable by said keys for all of said registers simultaneously, whereby the number may be typewritten upon the work-sheet at the time that the indexing devices are set for all of said registers, means acting subsequently to the completion of the printing and indexing operation, for running into a plurality of said registers the printed numbers, and means settable on the carriage to determine how many and which of said registers shall compute the printed number.

35. In a combined typewriting and computing machine, the combination with a plurality of registers, of groups of denominational-determining members, one group for each register, preliminary representation or indexing devices under control of said members, numeral keys for printing numbers and concomitantly acting on said indexing devices to set up the number printed, means acting subsequent to the printing and indexing operation for running into said registers the number which has been indexed and printed, a traveling carriage, and a plurality of selector dogs, one for each group of denominational-determining members, each settable to be effective or ineffective during the printing of a number in a column in respect to its group of members, whereby different numbers printed in a single column on a work-sheet may be run into the different registers, or the same amount run into any plurality of registers.

36. In a combined typewriting and computing machine, the combination with typewriting mechanism including numeral keys, and a letter-feeding carriage controlled thereby, of computing mechanism including a plurality of registers, a system of individually settable indexing pins or devices for each register, denomination-determining members coöperating with said carriage to determine the effectiveness of said keys upon said indexing pins or devices, and means to enable each of said keys to set indexing pins or devices simultaneously in the same denomination in all of said systems.

37. In a combined typewriting and computing machine, the combination with the plurality of stationary registers, of preliminary representation or indexing devices for said registers, a traveling carriage, a general operator for running into the registers the numbers indexed on said devices, typewriter numeral keys for printing columns of numbers at different places on the work sheet, and means adjustable at letter spaces along the carriage run for determining whether said general operator shall run any item printed in any of said columns, into one register or into any plurality of registers simultaneously.

38. A combined typewriting and computing machine, having a plurality of registers, preliminary representation of indexing devices for said registers, a single group of typewriter keys and a general operator for running into the registers the numbers indexed; and comprising in combination a plurality of zone controlling members one for each register adjustable independently of each other enabling said single set of keys to simultaneously set a plurality of indexing devices of corresponding denominations whereby items printed on the work sheet at any distance apart and at any portion of the work sheet may be run into any register or any plurality of registers simultaneously.

39. The combination with a plurality of registers, of actuating mechanism for said registers, a traveling carriage, said carriage having a movement relative to said registers and relative to said actuating mechanism, denominational-determining members, and parts carried by said carriage coöperating with said members and selectively adjustable along the carriage run to vary the instant of activity of the several registers.

40. In a combined typewriting and computing machine, the combination with a plurality of registers each having computing members, of actuating devices for said registers one for each computing member, denominational selecting members, one group for each register, said denominational members corresponding in number to said actuating devices; selecting means acting on said denominational members and adjustable at will for determining which of said registers shall be actuated by its actuating devices, said selecting means acting to control the denominational members in the same denomination of two or more registers and means for simultaneously actuating the various registers selected.

41. The combination with computing mechanism, of zeroizing mechanism for said computing mechanism, a zero key for controlling the bringing into play of said zeroizing mechanism, and a snap-action mechanism interposed between said key and said zeroizing mechanism for transmitting the continuous movement of said zero key over a considerable period to a quick setting of said zeroizing mechanism practically instantaneously.

42. The combination with a computing mechanism, of zeroizing mechanism for said computing mechanism, a zero key for controlling the bringing into play of said zeroizing mechanism, and means for delaying the effect of said zero key on said zeroizing mechanism until almost the end of the movement of said zero key.

43. The combination with a computing mechanism, of an error-correcting mechanism for said computing mechanism, an error key for controlling the bringing into play of said error-correcting mechanism, and an interponent mechanism between said error key and said error-correcting mechanism for translating a long even movement of said error key into a short snappy movement for effecting the action of said error-correcting mechanism.

44. The combination with a traveling carriage, of computing mechanism, denominational-selecting mechanism for said computing mechanism operated from said carriage during step-by-step movements of said carriage, tabulating mechanism for effecting major movements of said carriage, and mechanism for rendering said denominational-selecting mechanism inoperative brought into play by said tabulating mechanism, so as to prevent denominational selecting for said computing mechanism from said carriage during major movements of said carriage.

45. The combination with a traveling carriage, of tabulating mechanism for controlling major movements of said carriage, a computing mechanism, a dog carried by said carriage connected to control said computing mechanism, and means for rendering said dog ineffective, operated from said tabulating mechanism.

46. The combination with a typewriting mechanism including a traveling carriage and case-shift mechanism for determining the writing of upper and lower case characters, of computing mechanism coöperating with said typewriting mechanism to perform concomitantly computing and typewriting operations, a dog carried by said carriage connected to control said computing mechanism so as to synchronize the action of said computing mechanism with the action of said typewriting mechanism, and means operated by said case-shift mechanism for rendering said dog ineffective to control said computing mechanism.

47. The combination with a typewriting mechanism including a traveling carriage, tabulating mechanism for affording jump movements of said carriage, and key-shift mechanism for enabling the writing of upper and lower case characters, of computing mechanism coöperating with said typewriting mechanism to perform concomitantly typewriting and computing operations, a dog carried by said carriage connected to control the action of said computing mechanism, and means for rendering said dog ineffective, controlled both from said case-shift mechanism and from said tabulating mechanism, so as to prevent the concomitant action of said typewriting mechanism and said computing mechanism at certain times.

48. The combination with a typewriting mechanism including a traveling carriage, and a case-shift mechanism for enabling the writing of upper and lower case characters, of computing mechanism coöperating with said typewriting mechanism to afford combined typewriting and computing operations, a dog carried by said carriage for controlling computing zones or columns, and shifting means operated from said case-shift mechanism for moving said dog to an ineffective position when writing upper case characters.

49. The combination of a system of computation pins or devices, a letter-feeding carriage, tabulating mechanism for said carriage, a dog on said carriage, a set of pin-displacing jacks on the machine frame and operable in succession by said dog, a set of keys, types operable by said keys, means controlled by the keys to set any of the pins displaced by any jack, and means connected to said tabulating mechanism for effecting separation between the dog and jacks.

50. In a recording computing machine, the combination with a plurality of registers having decimal orders, of a traveling carriage having means for selecting the registers and the decimal orders of said registers, numeral printing devices, and means common to all of the decimal order selectors for preventing the printing of numerals in punctuation spaces, in a plurality of adding zones.

51. In a recording computing machine, the combination with a plurality of registers having decimal orders, of a decimal-order selector for each register, numeral keys, printing devices, and punctuation-space key-locking devices common to, and operated by, all of said decimal-order selectors.

52. In a recording computing machine, the combination with a plurality of registers having decimal orders, of a decimal-order selector for each register, numeral keys, printing devices, punctuation-space key-locking devices common to, and operated by, all of said decimal-order selectors, and means for arranging said locking devices with respect to the decimal-order selectors, so as to vary the location of the punctuation spaces as desired.

53. In a computing machine, the combination with computing wheels and numeral keys connected thereto, of a traveling carriage, a comma lock also connected to said keys for preventing the actuation of a numeral key at an improper position in the travel of said carriage, a case shift, and means for disconnecting said keys from said comma lock when said case is shifted.

54. The combination with a typewriting mechanism including a traveling carriage, and a tabulating mechanism for determining the position of said carriage, of a computing mechanism including denomination-determining mechanism, connections for enabling the actuation of said denomination-determining mechanism from said carriage, so as to enable the digits of a number to be computed in said computing mechanism in the same denominational order as written by said typewriting mechanism, and means actuated by said tabulating mechanism for interrupting the connection between said traveling carriage and said denomination-determining mechanism, so as to prevent the control of the determining of denomination by said carriage of said computing mechanism while said tabulating mechanism is in play.

55. The combination with a typewriting mechanism including a case-shift mechanism for determining the difference in changing between writing upper and lower case characters, of a computing mechanism including a denomination-determining mechanism, connections between said typewriting mechanism and said denomination-determining mechanism for enabling said typewriting mechanism to control said denomination-determining mechanism so as to enable the digits of a number to be computed in said computing mechanism in the same denominational order as written by said typewriting mechanism, and case-shift-actuated means for preventing the control by said typewriting mechanism of the action of said denomination-determining mechanism during the action of said case-shift mechanism.

56. The combination with a traveling carriage, of tabulating mechanism for controlling movements of said carriage, a computing mechanism, a series of selectors for controlling the denominational selections for said computing mechanism, a tappet carried by said carriage arranged to operate said selectors successively during a step-by-step letter-feeding movement of said carriage, and means controlled from said tabulating mechanism for disabling said selectors during the run of said carriage under control of said tabulating mechanism.

57. The combination with a letter-feeding carriage, of tabulating mechanism for controlling movements of said carriage, a computing mechanism, a series of selectors for controlling the denominational selections for said computing mechanism, a tappet carried by said carriage, arranged to operate said selectors successively during a step-by-step letter-feeding movement of said carriage, automatic means for disabling said selectors when said carriage is moving under control of said tabulating mechanism, and spring means for reënabling said selectors to make denominational selections after completion of such disabling movements, said tappet on such reënabling movement engaging the selector in register therewith, and through the aid of said spring means effecting a denominational selection.

58. In a combined typewriting and computing machine, the combination with numeral keys and a traveling carriage, of devices in which numbers are registered as written by said keys, a denomination selector for selecting said devices, a lock operated by said denomination selector for preventing the operation of a numeral key where another key should be operated, a case shift for said carriage, and means for automatically moving said selector to ineffective position when said case shift is operated.

59. In a combined typewriting and computing machine, the combination with numeral keys and a traveling carriage, of devices in which numbers are registered as written by said keys, a denomination selector for selecting said devices, a lock for preventing operation of a numeral key where another key should be operated, a case shift for said carriage, and means for moving said selector to ineffective position and rendering said lock ineffective when said case shift is operated.

60. The combination of a system of computation pins or devices, a carriage, a dog on said carriage, a set of pin-displacing jacks on the machine frame and operable in succession by said dog, keys, figure and other types operated by said keys, means controlled by the keys to set any of the pins displaced by any jack, and case-shifting means for effecting separation at will between the dog and jack elements to prevent operation of the jack by the dog when writing other than figures with said keys.

61. The combination of a system of computation pins or devices, a carriage, a dog on said carriage, a set of pin-displacing jacks on the machine frame and operable in succession by said dog, keys, figure types operated by said keys, means controlled by the keys to set any of the pins displaced by any jack, and case-shifting means for shifting said dog at will out of position for engagement with said jacks.

62. The combination with a computing mechanism, of a typewriting mechanism comprising a bank of keys including a series of numeral keys, selecting means for according the denominations as computed by said computing mechanism with the denominations as written by said typewriting mechanism, and silencing means actuated by certain of said keys other than said numeral keys for rendering said selecting means ineffective while operating said typewriting mechanism for a purpose other than writing numerals.

63. The combination with a series of computing wheels, of a series of denominational members for running up numbers in said computing wheels, a series of numeral keys for controlling the extent of movement of said denominational members, a series of jacks for bringing said denominational members individually into play, a traveling carriage, and a series of tappets carried by said carriage to actuate said jacks, said tappets being of three different effective reaches, and said jacks being likewise of three different effective reaches so that certain of said tappets will actuate solely accordant jacks.

64. The combination with a series of computing wheels, of a series of denominational members for running up numbers in said computing wheels, a series of jacks for bringing said denominational members individually into play, numeral keys for controlling the extent of movement of said denominational members, a traveling carriage, said jacks being of variable effective lengths, and a series of tappets for actuating said jacks, said tappets having dogs placed at different points along the length thereof so as to actuate different ones of said jacks according to the effective length thereof.

65. The combination with a plurality of computing heads, of a set of jacks individual to and arranged to control each computing head, a traveling carriage, and a plurality of tappets carried by said carriage and coördinating with different sets of said jacks to operate the same, the paths of travel and the ranges of action of said tappets overlapping each other, said tappets and said jacks being so constructed as to avoid discordant jacks and tappets of the other computing heads.

66. The combination with a plurality of computing heads, of a set of jacks connected to and arranged to control the action of each of said computing heads, a traveling carriage, and a plurality of tappets coöperating individually with different ones of said sets of jacks, the effective points of coöperation for the coördinating jacks and tappets being located in different vertical planes for the different sets of jacks.

67. The combination with a computing head, of groups of jacks connected to control the operation of said computing head, a traveling carriage, and a plurality of tappets carried by said carriage, said jacks bearing downward extensions of different lengths from front to rear, and certain of said tappets having dogs located in certain vertical planes so as to operate all of said jacks, and certain others of said tappets having dogs located in other vertical planes to actuate solely certain groups of said jacks.

68. The combination with a plurality of computing heads, of a plurality of sets of jacks connected to control the action of said computing heads, a traveling carriage, and a plurality of tappets carried by said carriage, the ranges of travel of said tappets overlapping and passing different sets of said jacks, said tappets and said jacks coöperating so that certain of said tappets will actuate solely coördinate sets of said jacks and will pass idly by discordant sets of said jacks.

69. The combination with a plurality of totalizers, of denominational selecting mechanisms for said totalizers including coöperating jacks and tappets of different ranges for controlling the activity of the various totalizers.

70. The combination with a plurality of totalizers, each including a plurality of number wheels, of actuating and computing mechanisms for said totalizers including means for initially setting up the numbers digit by digit and running the numbers as entireties into the number wheels, and denominational selecting mechanism of various ranges for controlling the activity and period of activity of said totalizers and their actuating and computing mechanisms.

71. In a combined typewriter and computing machine, the combination with the numeral keys of the typewriter, of a traveling carriage, a register, means adapted to be operated once for each line written by the typewriter to actuate the register and return said carriage to position for beginning the writing of a new line, and locking devices for preventing the operation of said numeral keys during the actuation of the register and the return movement of said carriage.

72. In a combined typewriting and computing machine, the combination with printing devices, of keys for printing both numerals and other characters, computing devices controlled by said keys, case-shifting devices, means for preventing said keys from printing in the punctuation spaces, and means actuated by said case-shifting devices for rendering said preventing means inoperative when said keys are used to print other characters than numerals.

73. The combination with a plurality of registers, independent of one another, of a typewriter carriage movable into and out of a computing zone common to said registers, and denomination selectors, one for each register, said selectors being settable at will independently of one another into and out of effective positions, and each selector capable of coöperation only with its own register, whereby any desired two or more of said registers may be caused to compute simultaneously the same individual item, and whereby the effectiveness of each selector may be limited to the run of the carriage within the common computing zone.

74. The combination with a typewriting mechanism including a letter-feeding carriage, of a succession of computing mechanisms, and a series of denomination selectors, one for each computing mechanism, the computing mechanisms including a set of parts to be engaged seriatim by the denomination selectors by reason of the letter-feeding travel of said carriage, each set of said parts being constructed differently from the remaining set or sets, and each denomination selector having a corresponding construction and thereby rendered capable of engaging that set of parts with which it is associated, but incapable of engaging the parts in the other set or sets at the letter-feeding travel of said carriage.

75. The combination with a typewriting mechanism including a letter-feeding carriage, of a succession of computing mechanisms, and a series of denomination selectors, one for each computing mechanism, said carriage connected to produce a relative step-by-step movement between said computing mechanisms and all of said selectors simultaneously, and each computing mechanism being controllable only by its own selector, so that each selector is movable idly past one or more of the remaining computing mechanisms at the letter-feeding travel of said carriage.

76. The combination with a typewriting mechanism including a letter-feeding carriage, of a succession of computing mechanisms, each inclusive of a set of denomination jacks, and a series of individually-adjustable denomination selectors connected to said carriage, each set of jacks being controllable only by its own selector, and each selector being movable idly past one or more of the remaining sets of jacks at the letter-feeding travel of said carriage.

77. In a combined typewriting and computing machine, the combination with typewriting mechanism including numeral keys, and a traveling carriage controlled thereby, of computing mechanism including a plurality of registers, a system of settable indexing pins or devices for each register, denomination-determining members having permanent locations in the machine and coöperating with said carriage to determine the effectiveness of said keys upon said indexing pins or devices, and means to enable each of said keys to set indexing pins simultaneously in the same denomination in all of said systems; provision being made for relative adjustment between the typewriting mechanism and the computing mechanism, to permit the computed numbers to be written in various selected zones upon the work-sheet, notwithstanding the permanent location of said denomination-determining members.

78. The combination with a plurality of registers, independent of one another, of typewriting mechanism includuing a carriage, groups of denomination-determining members, one group for each register, and selectors adjustable along the carriage, there being one selector for each group of denomination-determining members and each selector being capable of coöperation only with its own group of denomination-determining members, said groups of denomination-determining members being so far separated that the first selector can complete its selecting movement in connection with the first group of said members before the second selector initiates its selecting movement in connection with the second group, whereby numbers, and characters other than numbers, may be written on both sides of the computing zone, and whereby columns typewritten upon a work-sheet may be differently spaced apart than said registers, and whereby, when desired, computation may be performed in said registers simultaneously with numbers written in a single column on the work-sheet.

79. In a combined typewriting and computing machine, the combination with a plurality of registers, of groups of denomination-determining members, one group for each register, preliminary representation or indexing devices under control of said members, typewriter numeral keys for acting on said indexing devices to set up the number, means acting subsequently to the indexing operation for running into said registers the number which has been indexed, a traveling carriage, a plurality of selectors, one for each group, of denomination-determining members, each selector settable to effective or ineffective position in respect to its group of members, and an error-correcting device individual to each group of indexing devices, each error-correcting device manipulable subsequent to the setting-up operation but prior to the running-in operation, whereby the effect of an error in the setting of a selector dog may be avoided, so that the proper number will be run into the proper register or registers irrespective of said error in the setting of the selector dog.

80. In a combined typewriting and computing machine, the combination of a traveling carriage, printing numeral keys controlling said carriage, a plurality of registers, preliminary-representation or indexing devices for said registers, a set of denominational-determining members for each register coöperating with their respective preliminary representation devices, means controlled jointly by said keys and carriage and acting through the medium of both sets of denominational-determining members for enabling said keys, when printing any number, to set indexing devices for both registers, and a general operator to carry into said registers jointly the number so set up, means for bringing either of said registers to zero condition while the other register retains its total, preparatory to further joint operation of said registers.

81. The combination with a plurality of registers of a typewriter carriage movable into and out of a computing zone common to said registers, denominational selectors, one for each register, and means for printing the total standing on any register, each of said selectors being individual to a single register so that said total printing means may be operated at any portion of the carriage travel outside of said common computing zone.

82. A combined typewriting and computing machine comprising, in combination, a register, a traveling carriage, printing numerical keys controlling said carriage, a set of individually settable preliminary representation or indexing devices for said register, a plurality of additional registers, a set of individually settable indexing devices for each of said additional registers, denominational determining members for each of said registers, means acting through the medium of said denominational determining members for enabling said keys and said carriage to coöperate to set indexing devices in all of said sets simultaneously, and a general operator including means to coöperate with the key-set indexing devices in all the sets, for carrying into all the registers the number printed at a single operation of said keys.

83. In a combined typewriting and computing machine, the combination of type printing numeral keys, a traveling carriage under the control of said keys and movable into and out of a plurality of computing zones, a plurality of registers, preliminary representation mechanism under the joint control of said carriage and said keys and comprising a plurality of sets of individually settable indexing pins or devices, one set for each register, to set up the indexing devices for one whole number written by said keys at one portion of the carriage travel, and also to set up other indexing devices for another whole number written by said keys at another portion of the carriage travel, and means to carry said numbers simultaneously into the registers after the printing of both numbers; said carriage having denomination-selecting means adjustable along the carriage to permit variation in the positioning of the columns written by said keys upon the work-sheet.

84. In a combined typewriting and computing machine, the combination of type printing numeral keys, a letter-feeding carriage under the control of said keys and movable into and out of a plurality of computing zones, a plurality of registers, preliminary representation mechanism under the joint control of said carriage and said keys and comprising a plurality of sets of denomination jacks, one set for each register, and also comprising a plurality of sets of individually settable indexing pins or devices, one set for each register, said indexing devices selectable denominationally by said jacks and settable individually by said keys, and means operable after the typewriting of the numbers, for carrying the numbers into said registers; said carriage having jack-engaging means thereon and adjustable therealong to permit variation in the positioning of the columns written by said keys upon the work-sheet.

FREDERICK A. HART.

Witnesses:
ARTHUR A. JOHNSON,
EDITH B. LIBBEY.

Copies of this patent may be obtained for five cents each, by addressing the "Commissioner of Patents, Washington, D. C."